United States Patent [19]

Sitton et al.

[11] 4,255,270
[45] Mar. 10, 1981

[54] CHARACTERIZING PETROLEUM SULFONATES BY PHASE BEHAVIOR

[75] Inventors: Donald M. Sitton; Homer J. Sarrett, Jr., both of Bartlesville, Okla.

[73] Assignee: Phillips Petroleum Company, Bartlesville, Okla.

[21] Appl. No.: 947,232

[22] Filed: Sep. 29, 1978

[51] Int. Cl.$^3$ .............................................. C09K 3/00
[52] U.S. Cl. ................... 252/8.55 D; 166/252; 166/273; 166/274; 166/275
[58] Field of Search .................. 252/8.55 D; 166/252, 166/273, 274, 275

[56] References Cited

U.S. PATENT DOCUMENTS

| | | | |
|---|---|---|---|
| 3,330,344 | 7/1967 | Reisberg | 166/274 |
| 3,373,809 | 3/1968 | Cooke, Jr. | 166/273 |
| 3,467,190 | 9/1969 | Dunlap et al. | 166/273 X |
| 3,885,628 | 5/1975 | Reed et al. | 166/252 |
| 3,981,361 | 9/1976 | Healy | 166/252 |
| 3,992,149 | 11/1976 | Wang | 23/230 R |
| 4,125,156 | 11/1978 | Glinsmann | 166/252 |

OTHER PUBLICATIONS

"Modeling Crudes Oils for Low Interfacial Tension", R. L. Cash et al., Soc. of Petroleum Engineers, AIME., 3-22-76.

*Primary Examiner*—Benjamin R. Padgett
*Assistant Examiner*—J. L. Barr

[57] ABSTRACT

A method of characterizing a petroleum sulfonate of unknown average equivalent weight, comprising:
(a) identifying at least one substantially pure hydrocarbon which forms three phases, comprising; a predominantly water phase, a microemulsion phase and a predominantly oil phase, when a mixture of said petroleum sulfonate of unknown average equivalent weight, water, an electrolyte and said pure hydrocarbon is equilibrated; and
(b) assigning an effective average equivalent weight to the petroleum sulfonate of unknown average equivalent weight which is substantially equal to the average equivalent weight of a similarly prepared petroleum sulfonate of known average equivalent weight which when equilibrated with water, the electrolyte of step (a) and at least one pure hydrocarbon, having an equivalent alkane carbon number substantially equal to the equivalent alkane carbon number of the pure hydrocarbon identified in step (a), in the same proportions and under the same conditions as step (a), forms three phases, comprising; a predominantly water phase, a microemulsion phase and a predominantly oil phase. A technique for preparing and utilizing an aqueous surfactant solution for the recovery of oil from a subterranean reservoir is also disclosed as well as a technique for tailoring petroleum sulfonates for such use.

34 Claims, 11 Drawing Figures

CHARACTERIZING PETROLEUM SULFONATES BY PHASE BEHAVIOR

BACKGROUND OF THE INVENTION

In the art of recovering oil from subterranean reservoirs, it is known that substantial volumes of oil are left in the reservoir after all effective primary production techniques have been utilized. Consequently, it has been necessary to resort to secondary recovery techniques which involve driving the oil from the reservoir with a fluid such as water, high and low pressure gases, such as natural gas, air carbon dioxide, etc., a small slug of a fluid such as propane, a surfactant solution and the like, which is mutually miscible with the reservoir oil, followed by a driving fluid, such as natural gas, in the case of a propane slug and, preferably, water, in the case of a surfactant slug, and various combinations of these driving media. Techniques utilizing a slug of surfactant solution have become of increasing importance, and interest in using the same has increased, since such techniques can be utilized in reservoirs which have already been subjected to a secondary recovery technique, particularly where the reservoir has been produced to its economic limits by water flooding. These latter techniques are commonly referred to in the petroleum industry as tertiary oil recovery techniques.

The primary advantage of the use of surfactants in oil recovery techniques is that the surfactant reduces the interfacial tension between the oil and the water to such an extent that substantially increased quantities of oil can be displaced. These surfactants have been used in both systems forming microemulsions and those not forming microemulsions. When a microemulsion is utilized to accomplish a miscible displacement of the oil, certain drawbacks result, including the difficulty of maintaining miscible displacement throughout the reservoir and the difficulty of maintaining the low interfacial tensions necessary to provide effective immiscible displacement after miscible displacement has broken down.

In recent years it has been suggested that microemulsions be utilized in a technique in which the microemulsion is immiscible with the oil and water in the reservoir. In these conventional techniques a multiphase microemulsion system is formed above ground by mixing oil, brine and surfactant and injecting at least the immiscible microemulsion phase. However, this technique requires that substantial amounts of oil be reinjected into the reservoir. Thus the cost of the operation is substantially increased and, to the extent an oil other than the reservoir oil is utilized, problems occur due to the differing phase behaviors of different oils.

In order to overcome the above-mentioned and other difficulties encountered in the prior art use of surfactants in oil recovery, it is proposed, in U.S. Pat. No. 4,079,785 by James E. Hessert, David F. Boneau and Richard L. Clampitt, issued Mar. 21, 1978 and application Ser. No. 804,132 filed by Gilbert R. Glinsmann on June 6, 1977, which are incorporated herein by reference, that an effective immiscible surfactant drive can be carried out by injecting a slug of surfactant solution comprising a surfactant, an electrolyte, water and, optionally, a cosurfactant to form a multiphase system in situ in the reservoir, which comprises; at least two different regions, for example, an oil-rich region and a microemulsion region. The latter application points out that best results are obtained when three different multiphase regions are formed, namely, a microemulsion in equilibrium with an oil phase (hereinafter referred to as a gamma-type region), a microemulsion in equilibrium with both an oil phase and a water phase (hereinafter referred to as a beta-type region) and a microemulsion in equilibrium with a water phase (hereinafter referred to as an alpha-type region). It is also pointed out in copending application Ser. No. 804,132 that among the variables which affect the three-phase region in which a particular system will partition are salinity, oil type, surfactant average equivalent weight, cosurfactant type, and temperature. Application Ser. No. 804,132 also goes on to point out that if all variables are fixed except the salinity, the system will shift from a gamma-type to a beta type to an alpha-type as the salinity increases from zero. Finally, application Ser. No. 804,132 sets forth a simple procedure, which can be carried out in a laboratory, to establish the system of water, electrolyte, surfactant and, optionally, cosurfactant and the proportions thereof which will be most effective for enhancing oil recovery when injected into the reservoir of interest.

Due to their availability and because of economic reasons, the most commonly utilized surfactants are petroleum sulfonates. In selecting an appropriate petroleum sulfonate for use in the recovery technique of the said application Ser. No. 804,132 it is highly desirable that one know the average equivalent weight of the petroleum sulfonate. While the average equivalent weights of a number of commercially available petroleum sulfonates have been established, this not the case with all commercially available materials and, in addition, it is often necessary to tailor the petroleum sulfonate for use in a particular oil recovery process, since the particular petroleum sulfonate found most effective may not be commercially available. In addition, as will be pointed out hereinafter, certain petroleum sulfonates do not act as expected with respect to their phase behavior.

Characterizing petroleum sulfonates by the average equivalent weight method described in ASTM Procedure D-855-56 is useable only for a sodium sulfonate and is very time consuming. Analytical characterization methods, based on anionic surfactant dye complexex, are also subject to various problems due to impurities in the dye, salt effects and the interference of unreacted oil in the sulfonate.

In light of the above it would be highly desirable to provide a fast, reproducible and accurate technique for determining the effective average equivalent weight of petroleum sulfonates.

It is therefore an object of the present invention to provide a fast, accurate and reproducible technique for characterizing petroleum sulfonates.

Another object of the present invention is to provide a fast, accurate and reproducible technique for characterizing petroleum sulfonates for use in the displacement of oil from a subterranean reservoir.

Another and further object of the present invention is to provide a fast, accurate and reproducible technique for determining the effective average equivalent weights of petroleum sulfonates.

Another object of the present invention is to provide an effective, fast and accurate technique for determining the effective average equivalent weights of petroleum sulfonates which will permit one to produce petroleum sulfonates tailored to be most effective in oil recovery processes.

These and other objects and advantages of the present invention will be apparent from the following description.

SUMMARY OF THE INVENTION

In accordance with the present invention, the effective average equivalent weight of a petroleum sulfonate of unknown average equivalent weight is determined by identifying at least one substantially pure hydrocarbon which forms three phases, comprising; a predominantly water phase, a microemulsion phase and a predominantly oil phase, when a mixture of said petroleum sulfonate of unknown average equivalent weight, water, an electrolyte, optionally, a cosurfactant and said pure hydrocarbon is equilibrated; and assigning an effective average equivalent weight to the surfactant of unknown average equivalent weight which is substantially equal to the average equivalent weight of a similarly prepared petroleum sulfonate of known average equivalent weight which when equilibrated with water, the same electrolyte and a pure hydrocarbon, having an effective alkane carbon number substantially equal to the equivalent alkane carbon number of the pure hydrocarbon previously identified, in the same proportions and under the same conditions, forms three phases, comprising; a predominantly water phase, a microemulsion phase and a predominantly oil phase. By thereafter determining the equivalent alkane carbon number of a crude oil to be displaced from a subterranean reservoir and adjusting the effective average equivalent weight of the petroleum sulfonate, an aqueous surfactant system highly effective in the displacement of such oil from the reservoir may be prepared and utilized for such displacement.

DESCRIPTION OF THE PREFERRED EMBODIMENTS

Figure 1:
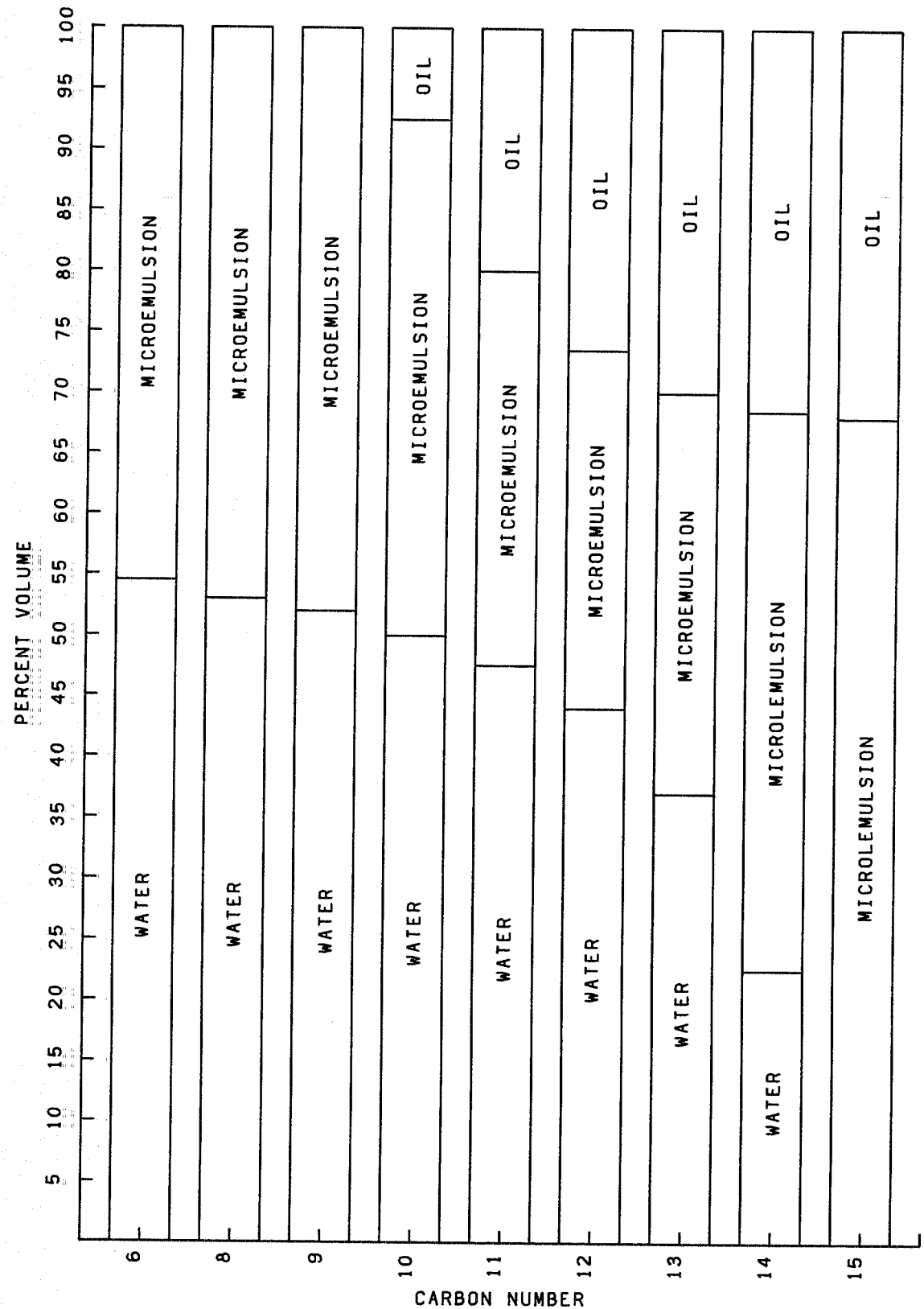
FIG. 1 is a bar graph showing the compositions of equilibrated mixtures of a surfactant system and oils having various equivalent alkane carbon numbers.

In accordance with the present invention it has been discovered that there is a linear relationship between the average equivalent weights of petroleum sulfonates and the equivalent alkane carbon numbers of hydrocarbons which form three phases when a mixture of the surfactant, water, an electrolyte and pure hydrocarbons are equilibrated.

Based on this discovery, in accordance with one embodiment of the present invention, a mixture of a petroleum sulfonate of unknown average equivalent weight, water, an electrolyte and, optionally, a cosurfactant is equilibrated with each of a plurality of pure hydrocarbons possessing equivalent alkane carbon numbers of about 1 through about 20. Each of the equilibrated mixtures will form three different types of multiphase regions, namely:

1. A microemulsion in equilibrium with an oil phase (hereinafter referred to as a gamma-type region);
2. A microemulsion in equilibrium with both an oil phase and a water phase (hereinafter referred to as a beta-type region); and
3. A microemulsion in equilibrium with a water phase (hereinafter referred to as an alpha-type region).

If the sulfonate of unknowwn average equivalent weight is compared with one or more similarly prepared sulfonates of known average equivalent weight to select a petroleum sulfonate of known average equivalent weight which when equilibrated with the same components, in the same proportions and under the same conditions, forms a three phases beta-type region with a substantially pure hydrocarbon having an equivalent alkane carbon number substantially equal to the equivalent alkane carbon number of the pure hydrocarbon identified when using the sulfonate of unknown effective average equivalent weight, then the average equivalent weight of the selected sulfonate of known average equivalent weight may be assigned to the sulfonate of unknown average equivalent weight.

In actual practice, however, a surfactant system containing a given sulfonate of unknown average equivalent weight will form three phases or a beta region on equilibration with hydrocarbons having a range of equivalent alkane carbon numbers. Stated differently, foreach specific sulfonate there is a lower equivalent alkane carbon number at which the three phase or beta region begins to form and a higher equivalent alkane carbon number at which the three phase or beta region ceases to exist upon equilibration of the systems containing the specific sulfonate. Consequently, a much more accurate determination of the effective average equivalent weight of a petroleum sulfonate of unknown average equivalent weight may be obtained by assigning to the petroleum sulfonate of unknown average equivalent weight an effective average equivalent weight substantially equal to the average equivalent weight of a similarly prepared petroleum sulfonate of known average equivalent which forms a three phase or beta region over substantially the same range of equivalent alkane carbon numbers when equilibrated with a series of substantially pure hydrocarbons having equivalent alkane carbon numbers over at least the same range as that determined for the petroleum sulfonate of unknown average equivalent weight.

A still more accurate assignment of an effective average equivalent weight ot the petroleum sulfonate of unknown average equivalent weight can be made by averaging the above-mentioned low and high equivalent alkane carbon numbers or selecting an alkane carbon number midway between said low and high equivalent alkane carbon numbers (sometimes referred to as the midpoint equivalent alkane carbon number of $C_{mp}$) for the equilibrated systems containing the petroleum sulfonate of unknown average equivalent weight and assigning an effective average equivalent weight to the petroleum sulfonate of unknown average equivalent weight which is substantially the same as the average equivalent weight of that petroleum sulfonate of known average equivalent weight whose equilibrated systems exhibit substantially the same average or midpoint equivalent alkane carbon number.

Finally, the most accurate determination can be made by equilibrating a mixture of each of a plurality of petroleum sulfonates of known average equivalent weight with each of a series of substantially pure hydrocarbons having equivalent alkane carbon numbers between about 1 and about 20, measuring the relative volumes of the phases and preparing phase-volume diagrams by plotting the volumes of the phases for each sulfonate against the equivalent alkane carbon numbers of the series of hydrocarbons. Then, if the known average equivalent weights of the petroleum sulfonates are plotted against the average or midpoint equivalent alkane carbon numbers obtained from their respective phase-volume diagrams, a plot having a straight line function is obtained. Thereafter, the sulfonate of unknown average equivalent weight is equilibrated with the same series of pure hydrocarbons and the volumes of each phase are measured. A plot of the volumes of the phases versus the equivalent alkane carbon numbers of the pure hydrocarbons is then made in the same manner as that for the series of sulfonates of known average equivalent weight. The midpoint or average equivalent alkane carbon number of the beta region for the sulfonate of unknown average equivalent weight may be determined from this latter phase-volume diagram. Finally, by locating this last determined midpoint or average equivalent alkane carbon number on the previously-mentioned plot of average equivalent weight versus equivalent alkane carbon number, the effective average equivalent weight of the sulfonate of unknown average equivalent weight can be read from the function of the plot.

The equivalent alkane carbon number midpoints cannot be directly determined for certain equilibrated systems because the average equivalent weights of the sulfonates are above the range which will form a defined three phase or beta region with hydrocarbons having equivalent alkane carbon numbers of 1 through 20. When this situation is encountered, the higher average equivalent weight sulfonates may be blended with a known sulfonate having a low average equivalent weight in a ratio such that an equilibrated system containing the mixture will form the beta region with $C_1$ to $C_{20}$ hydrocarbons. The average equivalent weight of the sulfonate mixture is determined by the following relationship.

$$\text{Avg. Eq. Wt.} = \frac{\sum\limits_i W_i}{\sum\limits_i \frac{W_i}{\text{Avg. Eq. Wt.}_i}} \quad (1)$$

The running index i extends over all sulfonate components and W is the active equivalent weight of each component. This relationship will thus permit one to define the midpoint equivalent alkane carbon number for sulfonates of high average equivalent weights, based on a few known and available sulfonates.

Sulfonates of unknown average equivalent weight for which the limits of the beta region cannot be defined in the selected hydrocarbon range of $C_1$ to $C_{20}$ may be characterized by blending with another sulfonate of well known characteristics. The $C_{mp}$ or midpoint can then be determined for the mixture, and the effective average equivalent weight of the sulfonate blend can be determined from the linear plot previously discussed. The effective average equivalent weight of the unknown sulfonate can then be calculated from the above-mentioned equation (1).

In addition to characterizing petroleum sulfonates of unknown average equivalent weights, the technique of the present invention also simultaneously provides information on the phase behavior of the sulfonate when utilized in formulations particularly useful for tertiary oil recovery as specified in the above-mentioned copending application Ser. No. 804,132. Specifially, it has been established that crude oils exhibit phase behaviors similar to straight chain alkane hydrocarbons. Generally, the crude oils imitate straight chain alkane hydrocarbons of 5 to 20 carbon atoms so far as their phase behavior is concerned and so far as their behavior with relation to sulfonate mixtures is concerned, as discussed herein. Accordingly, the present technique also provides valuable data which is useful in designing a sulfonate system for tertiary recovery as set forth in the said copending application.

Further, it is possible to utilize the technique of the present application to tailor a sulfonate for use in such tertiary oil recovery techniques or for other purposes.

Copending application Ser. No. 804,132 sets forth criteria for selecting the type and concentration of cosurfactants, the type and concentration of electrolytes (particularly the salinity of the brine solution) and the type and concentration of a surfactant which, when combined and injected into a reservoir, will result in the displacement of maximum quantities of oil therefrom.

While crude oils comprise complex hydrocarbon mixtures whose exact constituents have not been defined, it has heretofore been established that such crude oils mimic simple pure hydrocarbons in their interactions with anionic surfactants. Specifically, the phase relationships of most crude oils with anionic surfactants are the same as those of pure alkane hydrocarbons having from 5 to 20 carbon atoms per molecule and more specifically 6 to 16 carbon atoms per molecule. Consequently, an equivalent alkane carbon number (EACN) can be assigned to a given crude oil which is the same as the number of carbon atoms of one of the pure alkane hydrocarbons. Consequently, to the extent that the EACN of a crude is established, either the crude itself or the pure alkane hydrocarbon having the same EACN can be utilized in determining the phase relationship of the crude with anionic surfactants and the effectiveness of a surfactant or surfactant system as a displacing medium for the crude. While other series of hydrocarbons, such as alkylbenzenes (having EACN's equal to the number of carbon atoms in the alkyl substituent) and alkyl cyclohexanes (having EACN's equal to the number of carbon atoms in the alkyl substituent plus 4 for the cyclohexane group) can be utilized in studies of crudes, it is obviously most convenient to employ alkane hydrocarbons.

In any event, the EACN of a crude may be simply determined by the same equilibration techniques previously described for the characterization of a sulfonate of unknown effective average equivalent weight. In fact, the previously measured phase volumes of the equilibrated solutions containing the petroleum sulfonate of unknown average equivalent weight can be utilized in determining the EACN of a crude. Specifically, the previously measured phase volumes can be plotted against salinity to produce a series of phase volume diagrams for each of the series of pure alkane hydrocarbons. Alternatively, a single petroleum sulfonate of known average equivalent weight can be similarly equilibrated with each of a series of pure alkane hydrocarbons while varying the salinity of the mixtures and a series of plots of phase volume versus salinity for the series of alkane hydrocarbons can be prepared. Thereafter, the crude oil to be studied is equilibrated with the same petroleum sulfonate of unknown or known average equivalent weight at various salinities, the phase volumes measured and a plot of phase volume versus salinity prepared. The phase volume diagram for the crude can then be compared with the phase volume diagrams for the pure alkane hydrocarbons to determine which of the alkane hydrocarbons exhibits substantially the same phase relationship as the crude. More specifically, the alkane hydrocarbon exhibiting a three phase region over substantially the same range of salinity as the crude would be determined to be the equivalent alkane carbon number of the crude. Accordingly, an EACN would be assigned to the crude which is the same as the EACN of the selected pure hydrocarbon (in the case of pure alkane hydrocarbons, the number of carbon atoms in the molecule).

A more accurate assignment of an EACN to the crude can be made by plotting the range (width) of salinity of the three phase region or the average salinity or salinity at the midpoint of the three phase region, in terms of parts per million of electrolyte against th EACN's of the pure hydrocarbons, determining the range of salinity of the three phase region of the crude or the average midpoint salinity and reading the EACN of the crude from the function of the plot.

Having thus assigned an EACN to the crude oil in question, the criteria for designing a surfactant solution which will be most effective for displacing such crude, as set forth in application Ser. No. 804,132, can be employed. As set forth in said application, a surfactant solution, comprising; a surfactant, an aqueous electrolyte and, optionally, a cosurfactant is effective in the immiscible, microemulsion displacement of crude oil from a subterranean reservoir. Specifically while maintaining all variables constant except one, a series of such solutions are equilibrated with an oil at varying electrolyte concentrations, the phase volumes are measured and a series of phase-volume diagrams of the phase volumes versus salinity, are constructed. For example, the crude in question or a pure alkane hydrocarbon having the same EACN would be equilibrated with each of a series of cosurfactants and a plot for each cosurfactant constructed. Similarly, a series of different concentrations of the selected cosurfactant would be equilibrated at varying electrolyte concentrations and a series of plots constructed. In like manner, the type of surfactant (effective averge equivalent weight) and its concentration can be selected.

As taught in application Ser. No. 804,132, the establishment of the variables for the most effective surfactant solution is based on the electrolyte concentration of the solution. Specifically, best results in oil displacement are obtained with a surfactant solution exhibiting the narrowest electrolyte range over which the three phase or beta region of the phase volume diagram exists. This range of electrolyte concentration should be less than 1% by weight, based on the weight of the water, preferably between about 0.1 and 1.0 weight percent and ideally between about 0.1 and 0.5 weight percent.

Having established the other variables, a specific salt concentration should be that concentration at which the ratio of the volume of oil ($V_o$) to the volume of water ($V_w$) in the microemulsion phase of the three phase region is between about 0.1 and 10, preferably 0.5 to 5.0 and ideally 1.0. Optimum results are obtained where $V_o/V_w$ is 1.0 or, stated differently, $V_o = V_w$. This generally represents the average salinity in the three phase region or the midpoint salinity of the three phase region.

As a general rule, it has been found that petroleum sulfonates having an average equivalent weight between about 375 and 500 are most effective, preferably less than about 420. Further, if the EACN of the crude oil is above about 12, the best sulfonate will be one having an average equivalent weight in the higher portion of the range and, if the EACN of the oil is less than about 12, the best sulfonate will be one having an average equivalent weight in the lower portion of the range. All things being equal, however, the one whose equilibrated system exhibits the narrowest three phase region on a plot of phase volume versus salinity would be selected.

Having determined the best sulfonate, such sulfonate can then be prepared by adjusting the average equivalent weight of the sulfonate previously characterized above or below the effective average equivalent weight (EAEW) previously determined. One method of adjusting the EAEW of the sulfonate would be to blend several sulfonates using formula (1) above to establish the EAEW of the mixture. As a practical matter, it has been determined that any desired sulfonate can be produced by blending about three basic sulfonates. Another method would be to vary the feed materials and/or conditions of operation in the manufacture of the sulfonate.

The sulfonates referred to herein comprise preferably synthetic or petroleum sulfonates. For use in immiscible phase oil displacement a sulfonate will have an average equivalent weight within the range of about 375 to about 500. These sulfonates are well known in the art and are sometimes referred to as alkyl aryl sulfonates. They are also sometimes referred to as petroleum sulfonates. They may be a complex mixture of components including aryl sulfonates, alkaryl sulfonates with the mixture consisting mostly of monosulfonates having one $-SO_3Na$ (or $-K$ or $-NH_4$) group per molecule. These individual hydrocarbon sulfonates, for example, can include the following compounds: the ammonia, sodium, or potassium dodecyl sulfonates ($C_{18}H_{29}SO_3M$); alkane sulfonates such as octadecane sulfonate ($C_{18}H_{29}SO_3M$); and phenylalkane sulfonates such as phenyldodecane sulfonate ($C_{18}H_{29}CO_3M$). As used herein the term "equivalent weight" is used in the usual manner and in the case of pure monosulfonates, the equivalent weight equals the molecular weight whereas the equivalent weight of a disulfonate is equal to one-half of the molecular weight. The equivalent weights referred to are, as noted, average equivalent weights and there may be present significant amounts of sulfonates having equivalent weights as low as 200 and as high as 650.

By way of specific example, a suitable petroleum sulfonate can be prepared by treating a feed oil having the composition set forth in Table I below:

TABLE I

| Feed Oil | |
|---|---|
| Test Procedure | Value Observed |
| Refractive Index @ 70C | 1.4574 |
| Gravity @ 60F API | 32.8 |
| Sp. Gr. @ 60F | 0.8612 |
| Viscosity @ 210F | |
| CS | 4.11 |
| SUS | 39.8 |
| Viscosity Index | 100. |
| Molecular Weight (ASTM 2502) | 367 |
| Constituent Analysis (ASTM D-3238-74) | 7.03 $C_A$ |
| | 31.78 $C_R$ |
| | 24.84 $C_N$ |
| | 68.13 $C_P$ |
| | 0.29 $R_A$ |
| | 1.59 $R_T$ |
| | 1.30 $R_N$ |

The feed is reacted with a mixture of $SO_2$ and $SO_3$ at a pressure high enough to keep the reactants in the liquid phase. The $SO_2$ is then removed by lowering the pressure and increasing the temperature. The acid products are then neutralized with ammonia, sodium hydroxide or the like. The sulfonate product is extracted from unreacted oil with isopropyl alcohol and water. The alcohol and water are then boiled off. Typical conditions of operations and analysis of the product are set forth in Table II. The average equivalent weight was determined as set forth previously.

TABLE II

| Operational Parameters | |
|---|---|
| Oil Feed Rate | 1993 ml/hour |
| $SO_3$ to Oil Ratio | 0.073 |
| $SO_2$ to $SO_3$ Ratio | 10.0 |
| Recovery Procedure | |
| Neutralization with $NH_3$ was followed by extraction with Isopropyl alcohol and water to obtain sulfonate product | |
| % Yield of Sulfonate | 20.8 (based on oil feed) |
| Analysis of Sulfonate Product | |
| Sulfonate | 81.3% |
| Unsulfonated Oil | 10.4% |
| Volatiles | 7.1% |
| Equivalent Weight of Sulfonate | 421 |

The EAEW of the sulfonate can be adjusted by varying the $SO_3$/feed oil ratio or the reactor temperature. Other parameters which can be adjusted to vary the EAEW and quality of the sulfonate are fractionation, solvent extraction of the feed oils and the isopropyl alcohol-$H_2O$ extraction of the sulfonate.

In addition to tailoring a sulfonate for oil recovery it is obvious that sulfonates can also be customized for other purposes by practicing the present invention.

The surfactant is used in the mixture, in accordance with the present invention, in an amount within the range of about 1 to 7, preferably 2 to 5 weight percent active ingredient based on the weight of the water.

The water plus inorganic salt constituents comprises about 85 percent or more of the total mixture. Suitable inorganic salts include sodium sulfate, sodium nitrate, sodium chloride, sodium tripolyphosphate ($Na_5P_3O_{10}$), sodium carbonate, etc., but the nonmetallic, monovalent metallic salts, particularly sodium chloride, are preferred. Preferably, inorganic salts are present in water in an amount within the range of about 250 to about 100,000, more preferably 500 to 40,000, most preferably 5,000 to 25,000 parts per million total dissolved solids (TDS). Other electrolytes which may be present in combination with the sodium chloride include potassium chloride, calcium chloride, magnesium chloride, sodium sulfate, ammonium chloride, and the like. Large amounts of polyvalent, in particular divalentions, are undesirable. If divalent ions are present in relatively large amounts, surfactants which are particularly suited for high tolerance to polyvalent ions may be used.

As previously indicated the use of a cosurfactant in the mixture is optional but is preferred. The cosurfactant may be any alcohol, amine, ester, aldehyde or ketone containing about 1 to about 20 carbon atoms and preferably having a solubility in water within the range of about 0.5 to 20, more preferably 2 to 10 grams per hundred grams of water at 20° C. Preferred materials are $C_4$ to $C_7$ alkanols or mixtures thereof. Most preferred are $C_4$ and $C_5$ alcohols having a solubility within the above range. Isobutyl alcohol with a solubility of 9.5 grams per 100 grams of water is particularly suitable. Other preferred cosurfactants include secondary butylalcohol, n-butyl, n-amyl, and isoamyl alcohol. When used, the cosurfactant is utilized in amounts within the range of about 1 to 7, preferably 1.5 to 4 weight percent based on the weight of water. In general, any combination of surfactants and cosurfactants which meet the criteria previously described may be utilized in the mixtures.

As a matter of convenience, standard solutions or mixtures are utilized in accordance with the present invention to characterize the sulfonate. A perferred mixture comprises 3 parts by volume of the pure hydrocarbon, with 5 parts by volume of a sulfonate composition, comprising; 3.5 weight percent active sulfonate, 3.0 weight percent isobutyl alcohol, 1.5 weight percent sodium chloride and distilled water. The mixtures are equilibrated at 25° C. The standard surfactant system components and concentrations used here were chosen after studying the effect of different alcohols, different concentrations thereof and different concentrations of sodium chloride and sulfonate. For example, it was found that replacing the isobutyl alcohol with another cosurfactant increased the equilibration time from about 1 hour to about 24 hours and the $C_{mp}$ or midpoint equivalent alkane carbon number for equilibrated solutions of a given sulfonate changed from 13.5 to 8.4 to 8.0, respectively. Reduction of the sodium chloride concentration from 1.5 to 1.0 and 0.5 weight percent, respectively, also increased the equilibration time to about 24 hours and changed the $C_{mp}$ or midpont for the same sulfonte from 13.5 to 10.0 to 6.5, respectively. The least sensitive variable was found to be the sulfonate concentration. Reduction of the sulfonate concentration to 3.0 and 2.0 active weight percent did not affect the equilibration time and the m changed only to 13.4 and 13.2, respectively. A series of sulfonates were chosen as standards which comprise petroleum sulfonates since these sulfonates, as manufactured by Witco Chemical Company, have well known average equivalent weight and the sulfonates have been reasonably well characterized. However, sodium dodecylbenzene sulfonate was also found to give midpoint alkane carbon numbers which agree with the linear correlation found to exist for the previously mentioned sulfonates.

EXAMPLE I

By way of specific example, 15 milliliter samples of different hydrocarbons having equivalent alkane carbon numbers over the range of 1 to 15 were individually equilibrated with 25 milliliter portions of a saline surfactant system comprising 3.6 weight percent active sulfonate of known equivalent weight (Witco Chemical Co., sodium petroleum sulfonates), 1.5 weight percent sodium chloride and 3.0 weight percent isobutyl alcohol. Each of the 40 milliliter mixtures, contained in a graduated vessel, was allowed to equilibrate at a specified temperature, in this case 80° F., for a given period of time, such as one hour, and the volumes of the phases were recorded. If, for example, 9 hydrocarbons of different equivalent alkane carbon numbers are to be individually equilibrated against a given saline surfactant system containing sodium petroleum sulfonates of known equivalent weight, it is convenient to prepare approximately 250 milliliters of the saline surfactant system as a stock solution for immediate use; since 25 milliliter aliquots of said stock solution are required for each 15 milliliter sample of the 9 different hydrocarbons referred to.

Figure 2:
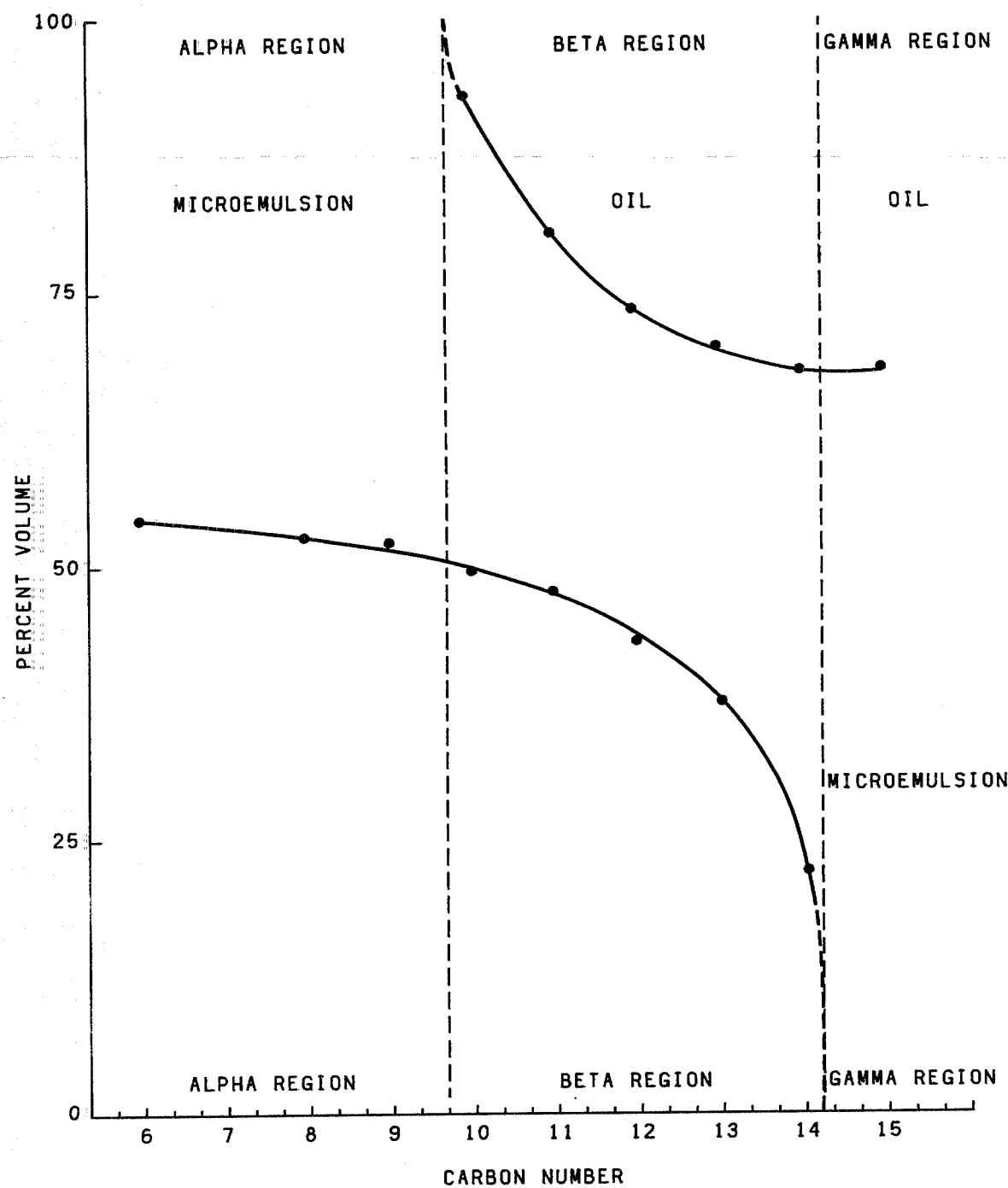
FIG. 2 is a phase volume diagram plotted from data such as that shown in FIG. 1.

In general, the equilibrated 40 milliliter mixture will typically exhibit two phases, three phases and two-phases, respectively, as the equivalent alkane carbon number of the various hydrocarbon components increases, for example, from 6 through 15. The two phase region which corresponds to the lower equivalent alkane carbon numbers is referred to as the alpha region and consists of an upper oil-external microemulsion phase and a lower predominantly water phase. The three phase region which corresponds to the intermediate equivalent alkane carbon numbers is referred to as the beta region and consists of an upper predominantly oil phase, a middle microemulsion phase and a lower predominantly water phase. The two phase region, which corresponds to the higher equvalent alkane carbon numbers and is reffered to as the gamma region, consists of an upper oil phase and a lower water-external microemulsion phase. For a given saline surfactant system containing a commercially available petroleum sulfonate having a known average equivalent weight, provided by the supplier, equilibration with each of the above-mentioned nine hydrocarbons would yield multiphase systems as represented by FIG. 1. Each of the columns in FIG. 1 schematically represent the profiles of the equilibrated systems, for example, in graduated cylinders calibrated in milliliters. The data of FIG. 1 can also be presented as a phase-volume diagram as illustrated by FIG. 2 of the drawings, wherein the present volume of the various phases is plotted against the equivalent alkane carbon number of the hydrocarbon component. The midpoint equivalent alkane carbon number of the three phase (beta) region determined by inspection of FIG. 2 is approximately 11.8.

The above-described procedure is repeated with additional petroleum sulfonates of known average equivalent weight or mixtures thereof to obtain the equivalent alkane carbon number midpoint of the three phase region.

Figure 3:
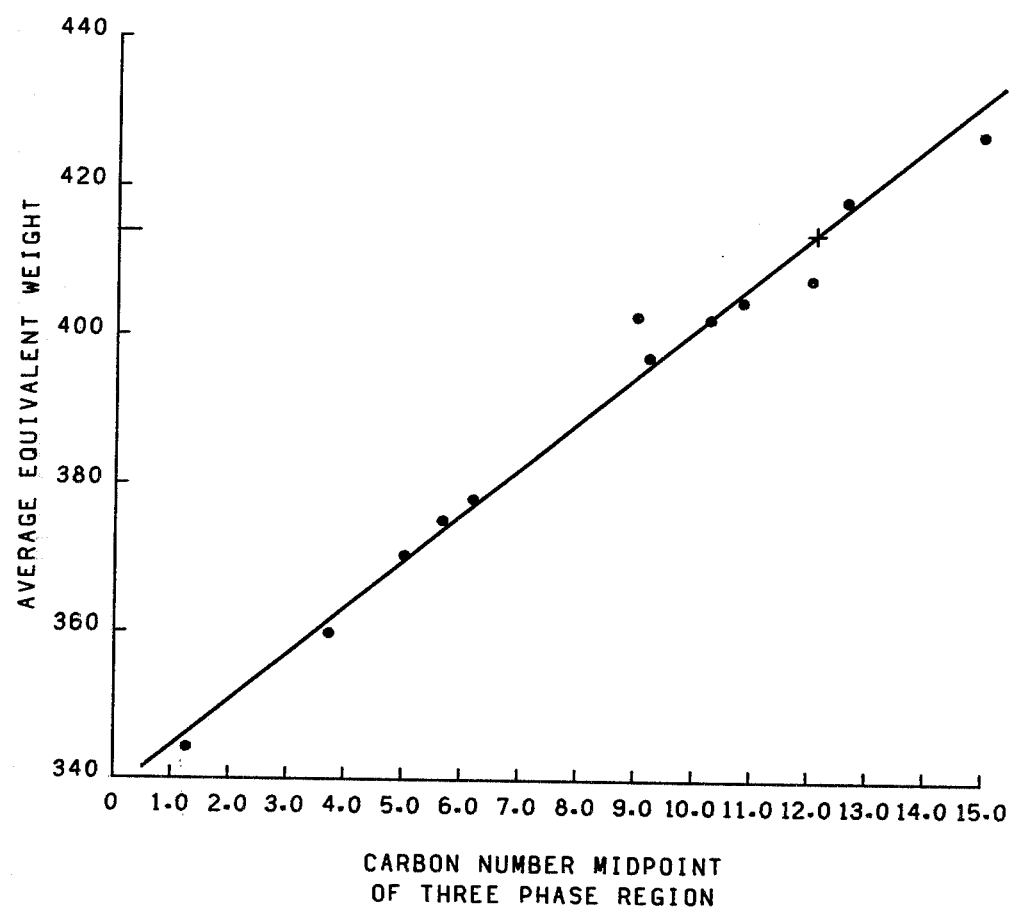
FIG. 3 is a plot showing the relationship of sulfonate average equivalent weight and oil equivalent alkane carbon number.

The linear correlation which is shown plotted as FIG. 3 results from plotting the average equivalent weights of sulfonates of known average equivalent weights and mixtures derived from commercial sulfonates versus the midpoint equivalent alkane carbon number of the three phase region, obtained from a series of phase-volume diagrams, such as illustrated in FIG. 2. Three of the points plotted in FIG. 3 represent the results obtained when using the commercially available petroleum sulfonate as received from the supplier. Although the points in FIG. 3 are based on the information shown in Table I below, mixtures of petroleum sulfonates of known equivalent weights were used to obtain the range of equivalent weights shown in Table III. These, of course, were determined by utilizing formula (1), previously discussed.

TABLE III

Petroleum Sulfonates of Known Equivalent Weights and Corresponding Carbon Numbers for Mid-points of Three Phase Region (See FIG. 3)

| Run No. | Witco Chemical Co. Petroleum Sulfonates | Sulfonate Equivalent Wt. | Carbon Numbers of 3-Phase Region Midpoint |
|---|---|---|---|
| 1 | TRS-40 | 340 | 1.2 |
| 2 | 25 wt. % TRS 10-410 75 wt. % TRS 40 | 356 | 3.65 |
| 3 | 33.3 wt. % TRS 16 66.7 wt. % TRS 40 | 367 | 5.0 |
| 4 | 33.3 wt. % TRS 18 66.7 wt. % TRS 40 | 372 | 5.70 |
| 5 | 50 wt. % TRS 10-410 50 wt. % TRS 40 | 375 | 6.2 |
| 6 | 66.7 wt. % TRS 10-410 33.3 wt. % TRS 40 | 401 | 9.1 |
| 7 | 75 wt. % TRS 10-410 25 wt. % TRS 40 | 395 | 9.3 |
| 8 | 25 wt. % TRS 40 75 wt. % B$^a$ | 401 | 10.3 |
| 9 | 50 wt. % TRS 18 50 wt. % TRS 40 | 403 | 10.9 |
| 10 | TRS 10-395 | 407 | 11.1 |
| 11 | 66.7 wt. % TRS 16 33.3 wt. % TRS 40 | 406 | 12.1 |
| 12 | TRS 10-410 | 417 | 12.7 |
| 13 | 31.3 wt. % TRS HMW, 4.8 wt. % TRS 18, 19.8 wt. % TRS 10-410, 44.1 wt. % TRS 40 | 427 | 15.1 |

$^a$The symbol B represents the mixture 58.1 wt. % TRS 40, 14.8 wt. % TRS 10-410, 3.6 wt. % TRS 18, 25 wt. % TRS HMW.

The effective average equivalent weights of petroleum sulfonates of unknown average equivalent weights was then determined by preparing saline surfactant systems of the same type and characteristics as those prepared with the sulfonates of known equivalent weight but in this case substituting the sulfonate of unknown equivalent weight for the sulfonate of known equivalent weight. The equilibrated solutions were measured to obtain the volume of each phase for each of a series of hydrocarbons containing 6 to 16 carbon atoms and phase-volume diagrams were plotted for these saline surfactant systems. Plots for three samples of the same sodium petroleum sulfonate of unknown average equivalent weight are set forth as FIGS. 4, 5 and 6 of the present application. These three samples were taken from the same batch of experimental sulfonate and the three samples studied in order to check the precision of the technique of the present application. These samples were identified as Sample A, Sample B and Sample C. In order to examine the phase behavior of hydrocarbon-surfactant brine systems of each of these three petroleum sulfonate samples, 200 grams of the saline surfactant system; containing, 3.0 weight percent isobutyl alcohol, 1.5 weight percent sodium chloride and 3.6 active weight percent of the petroleum sulfonate were prepared. Individual 25 milliliter aliquots of the saline surfactant system were equilibrated, at 77° F., with 15 milliliter samples of hydrocarbons exhibiting equivalent alkane carbon numbers of 9 to 15. At the end of approximately one hour the volumes of the phases were observed and recorded as shown in Table IV below. The total volume of each equilibrated system was about 40 milliliters.

TABLE IV

Equilibration of Hydrocarbon-Surfactant-Cosurfactant-Brine Systems Containing Experimental Samples of Petroleum Sulfonates

| Sample | Effective Alkane Carbon Number of Hydrocarbon[a] | Phase Behavior | | Phase Volumes | | | % Volume | | | Carbon No. Mid-Point |
|---|---|---|---|---|---|---|---|---|---|---|
| | | Type | No. of Phases | Bottom (ml) | Middle (ml) | Top (ml) | Bottom | Middle | Top | |
| A. (see FIG. 4) | 9 | α | 2 | 21.0 | None | 19.0 | 52.5 | 0.0 | 47.5 | 12.15 |
| | 10 | α | 2 | 19.9 | None | 20.1 | 49.8 | 0.0 | 50.2 | |
| | 11 | β | 3 | 19.0 | 13.6 | 7.4 | 47.5 | 34.0 | 18.5 | |
| | 12 | β | 3 | 17.9 | 11.8 | 10.3 | 44.8 | 29.5 | 25.8 | |
| | 13 | β | 3 | 15.9 | 12.7 | 11.4 | 39.8 | 31.8 | 28.5 | |
| | 14 | γ | 2 | 28.0 | None | 12.0 | 70.0 | 0.0 | 30.0 | |
| | 15 | γ | 2 | 27.6 | None | 12.4 | 69.0 | 0.0 | 31.0 | |
| B (see FIG. 5) | 9 | α | 2 | 20.5 | None | 19.5 | 51.2 | 0.0 | 48.8 | 12.15 |
| | 10 | α | 2 | 20 | None | 20 | 50.0 | 0.0 | 50.0 | |
| | 11 | β | 3 | 18.9 | 13.5 | 7.6 | 47.3 | 33.7 | 19.0 | |
| | 12 | β | 3 | 17.9 | 12.1 | 10 | 44.8 | 30.2 | 25.0 | |
| | 13 | β | 3 | 16.0 | 12.8 | 11.2 | 40.0 | 32.0 | 28.0 | |
| | 14 | γ | 2 | 28.1 | None | 11.9 | 70.2 | 0.0 | 29.8 | |
| | 15 | γ | 2 | 27.0 | None | 13.0 | 67.5 | 0.0 | 32.5 | |
| C (see FIG. 6) | 9 | α | 2 | 20.7 | None | 19.3 | 51.8 | 0.0 | 48.2 | 12.25 |
| | 10 | α | 2 | 20.0 | None | 20.0 | 50.0 | 0.0 | 50.0 | |
| | 11 | β | 3 | 18.8 | 17.0 | 4.2 | 47.0 | 42.5 | 10.5 | |
| | 12 | β | 3 | 17.0 | 13.3 | 9.7 | 42.5 | 33.2 | 24.3 | |
| | 13 | β | 3 | 13.9 | 15.1 | 11.0 | 34.7 | 37.8 | 27.5 | |
| | 14 | γ | 2 | 28.0 | None | 12.0 | 70.0 | 0.0 | 30.0 | |

[a]EACN numbers 9, 10, 12, 14 and 15 correspond to the use of pure hydrocarbons nonane, decane, dodecane, tetradecane and pentadecane; EACN numbers 11 and 13 correspond to the use of equimolar blends of decane and dodecane; and dodecane and tetradecane, respectively.

Figure 4:
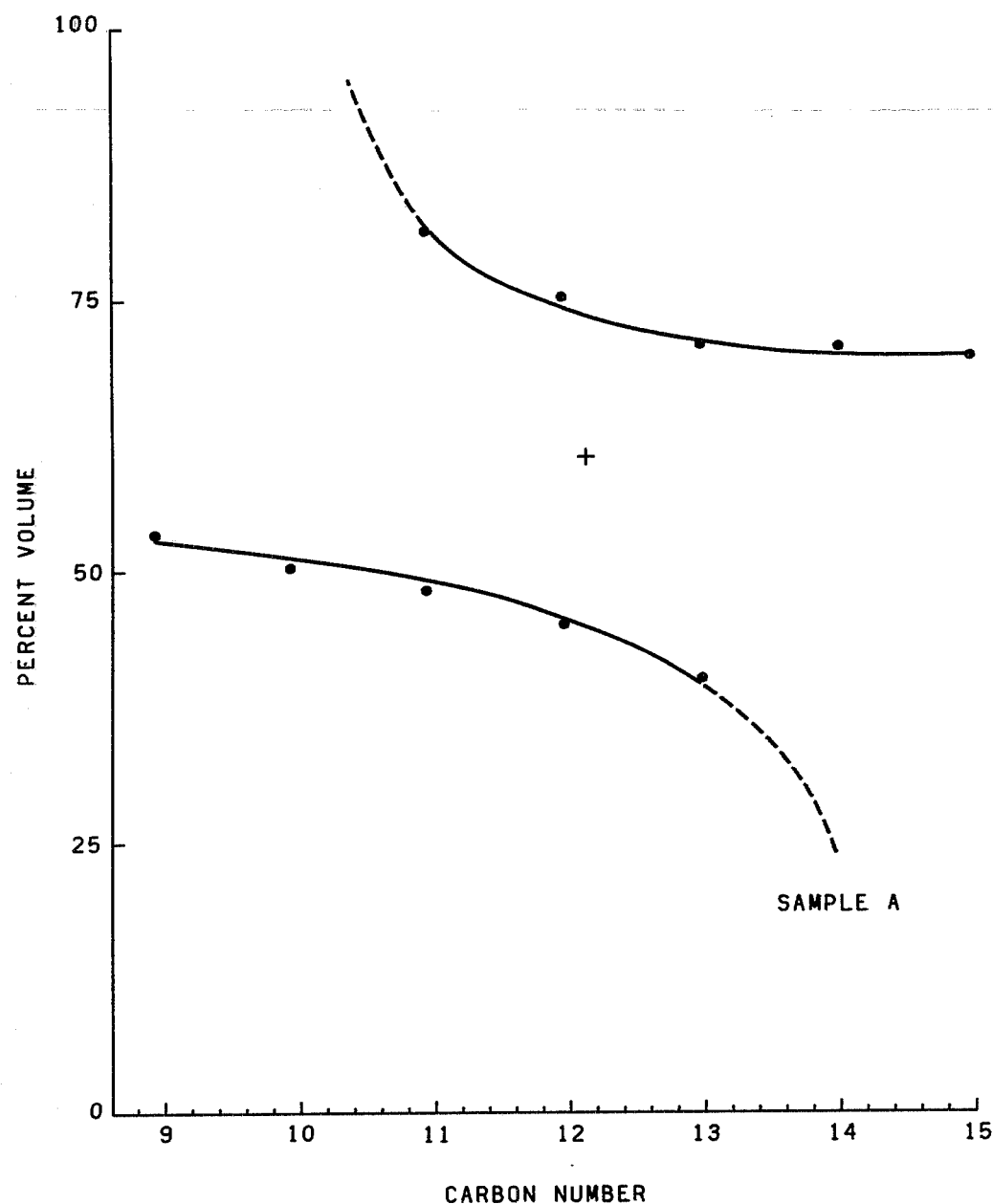
FIGS. 4, 5 and 6 are phase volume diagrams similar to FIG. 2 for three sulfonates of unknown average equivalent weight, respectively
Figure 5:
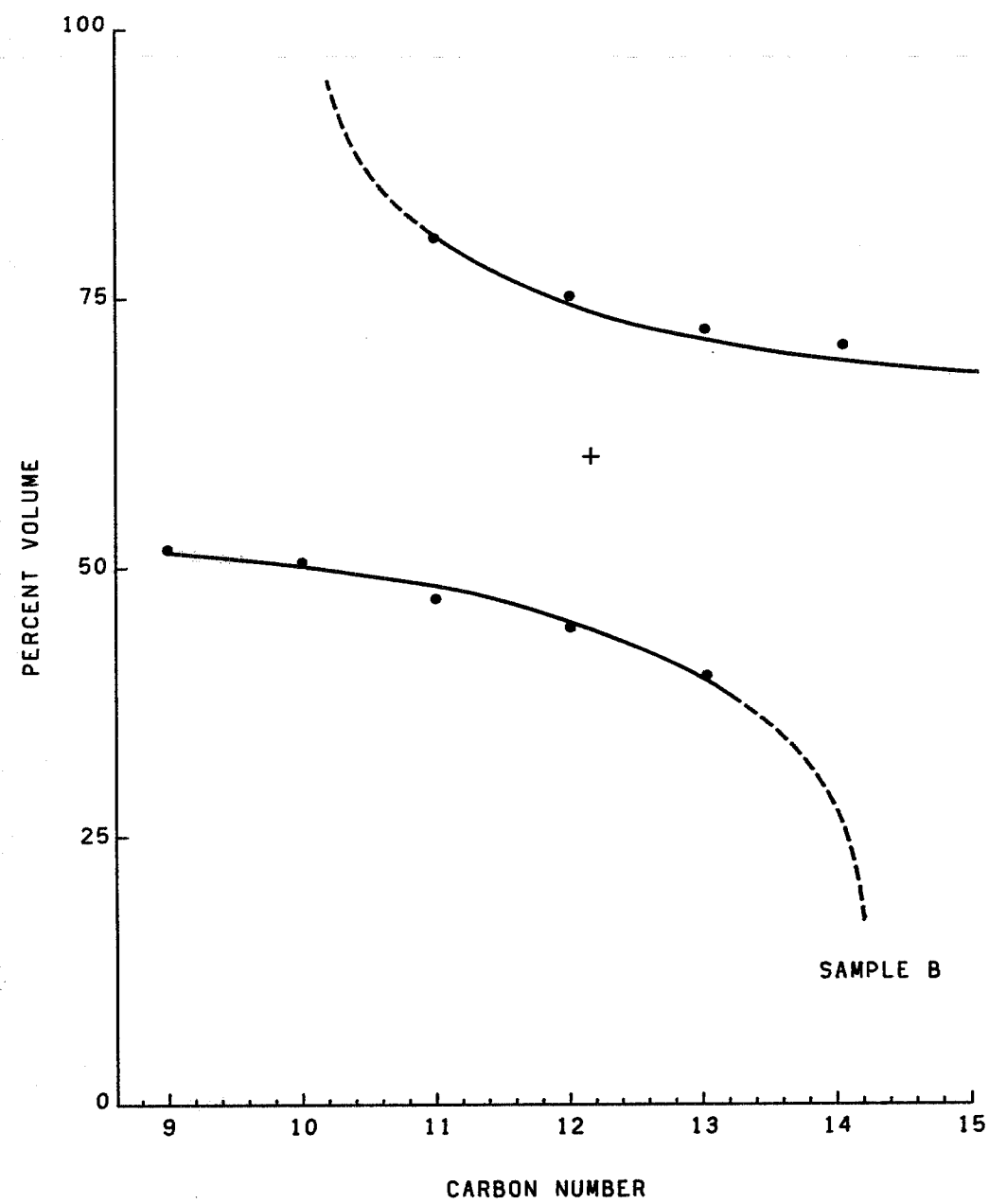
Figure 6:
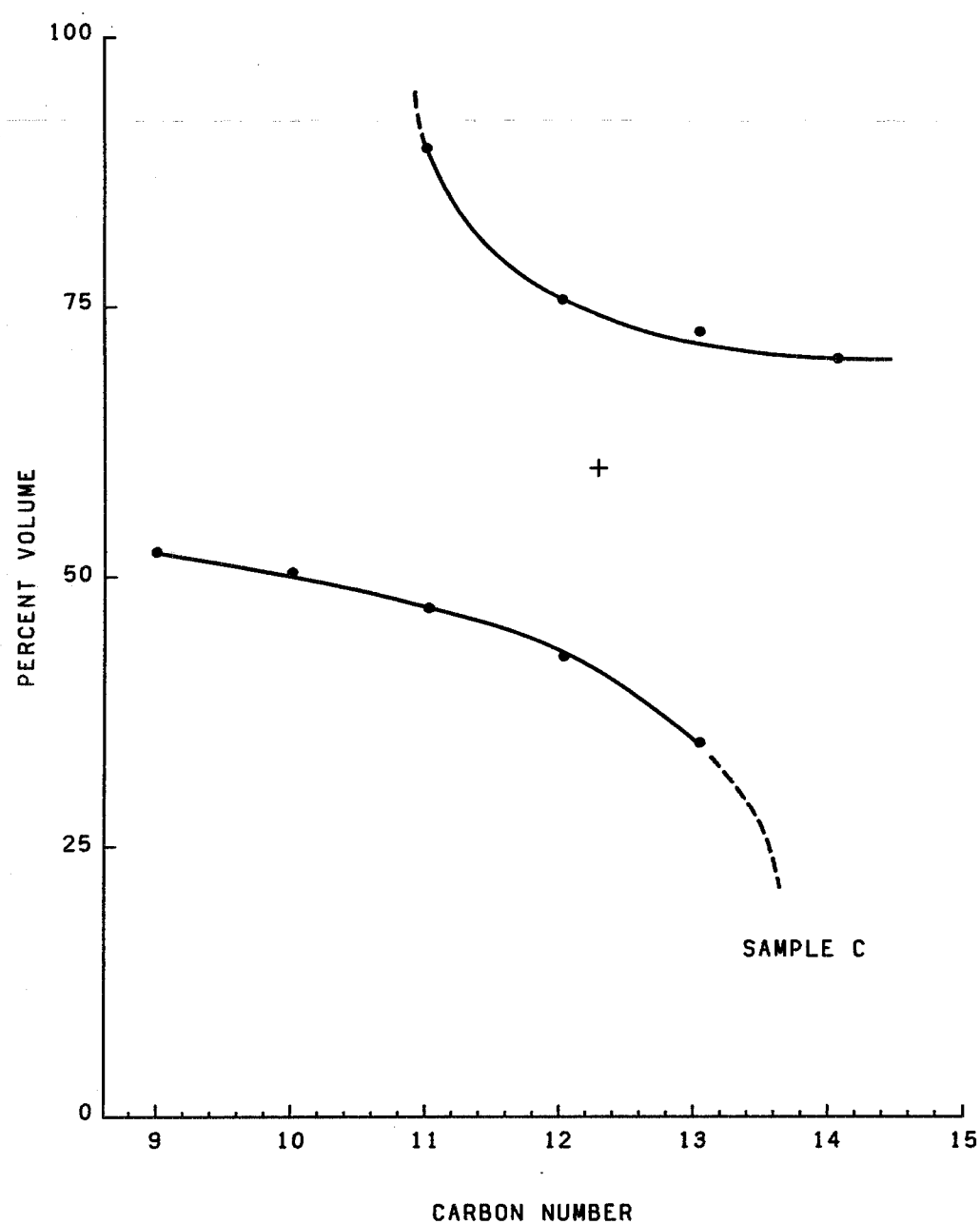

The carbon number midpoints of samples A, B and C, respectively, are shown in FIGS. 4, 5 and 6 and were 12.15, 12.15 and 12.25, respectively. The average of these values therefore was 12.2. In order to estimate the equivalent weight of the experimental sulfonate, the linear plot of FIG. 3 was used. According to this plot, a carbon number three phase midpoint of 12.2 was determined and corresponds to an equivalent weight of about 413.

It is to be observed from FIG. 3 that the straight line or linear relationship of FIG. 3 can be expressed by the following equation.

$$\text{Avg. Eq. Wt.} = 6.6\, m + 333 \quad (2)$$

where m is the effective alkane carbon number midpoint of the three phase region.

While sodium alkyl aryl sulfonates were utilized in the above example, it has also been established that the effective alkane carbon number midpoint (m) for sodium dodecylbenzene sulfonate fits the linear correlation of FIG. 3.

EXAMPLE II

It has also been established that the present technique can be utilized to characterize petroleum sulfonates other than the sodium sulfonates. This is established by the following evaluation of experimental petroleum sulfonates. Since these sulfonates were ammonium sulfonates, a comparison of sodium and ammonium salts of the same sulfonic acid was made. Nine sulfonic acids were each neutralized with both ammonium and sodium hydroxide, respectively, and the $C_{mp}$ was determined for each sulfonate and are set forth in Table V.

TABLE V

| Sulfonate | Type of Salt | $C_{mp}$ | Avg. Eq. Wt. |
|---|---|---|---|
| 1 | Na | 8.6 | 389 |
| 2 | Na | 7.3 | 380 |
| 3 | Na | 5.4 | 368 |
| 4 | Na | 15.8 | 437 |
| 5 | Na | 11.9 | 409 |
| 6 | Na | 12.9 | 417 |
| 7 | Na | 14.9 | 427 |
| 8 | Na | 10.5 | 402 |
| 9 | Na | 12.3 | 413 |
| 10 | Na | 9.1 | 392 |
| 11 | NH4 | 10.0 | 384 |
| 12 | NH4 | 8.0 | 375 |
| 13 | NH4 | 6.7 | 363 |
| 14 | NH4 | 17.1 | 432 |
| 15 | NH4 | 13.1 | 404 |
| 16 | NH4 | 13.8 | 412 |
| 17 | NH4 | 15.3 | 422 |
| 18 | NH4 | 11.6 | 397 |
| 19 | NH4 | 13.8 | 408 |
| 20 | NH4 | 10.5 | 387 |

Figure 7:
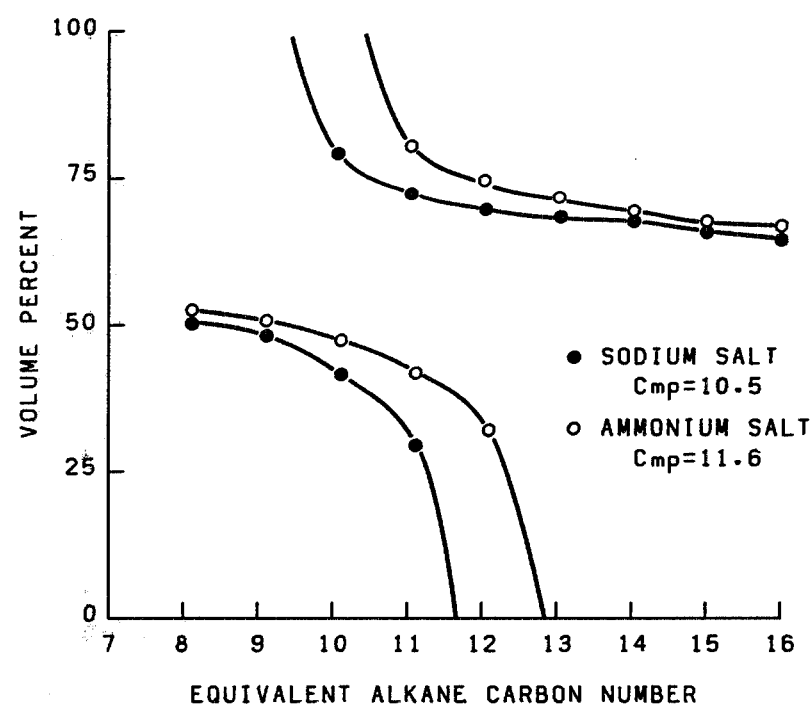
FIG. 7 is a phase volume diagram similar to FIG. 2 for sodium and ammonium sulfonates of the same sulfonic acids.
Figure 8:
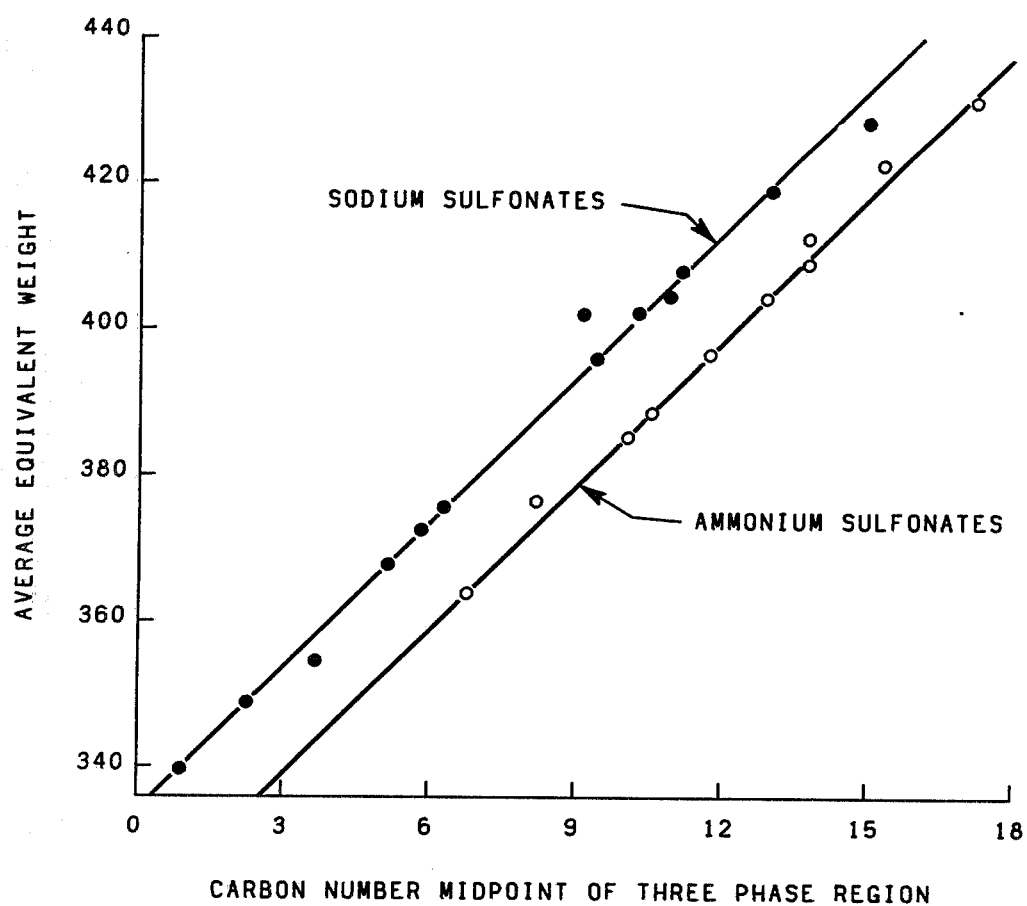
FIG. 8 is a plot similar to FIG. 3 for sodium and ammonium sulfonates, respectively.

An example of the phase behavior of ammonium sulfonates and sodium salts of the same sulfonic acids is shown in FIG. 7, where $C_{mp}$ is the carbon number midpoint. The effective average equivalent weights of the sodium sulfonates were determined from the previously established correlation, and the average equivalent weight of the corresponding ammonium sulfonates were taken to be 5 units lower, since the molecular weight of ammonium is 5 units lower than the atomic weight of sodium. The midpoints for the ammonium sulfonates were then plotted versus the average equivalent weight determined in this manner, and this data is shown in FIG. 8. The linear relationship therefore for the ammonium sulfonates was:

$$\text{Avg. Eq. Wt.} = 6.6\, m + 319 \quad (3)$$

This relationship can then be used to determine the average equivalent weight of ammonium sulfonates using the standard surfactant system previously described. The midpoints themselves are actually a more important parameter than the number representing the average equivalent weight since they give a direct comparison of the phase behavior of one sulfonate with another, which is highly desirable and useful in designing a system for tertiary oil recovery.

If a pure hydrocarbon in the range $C_1$-$C_{20}$ is not available, the following well established equivalent alkane carbon number (EACN) mixing rule developed by Cash et al, "The Application of Low Interfacial Tension Scaling Rules to Binary Hydrocarbon Mixtures", *J. Colloid Interface Sci.* (1976), can be used:

$$EACN_{avg} = \sum_i X_i EACN_i, \quad (4)$$

where the $EACN_i$'s are EACN values of the constituents and the $X_i$'s are mole fractions.

EXAMPLE III

Figure 9:
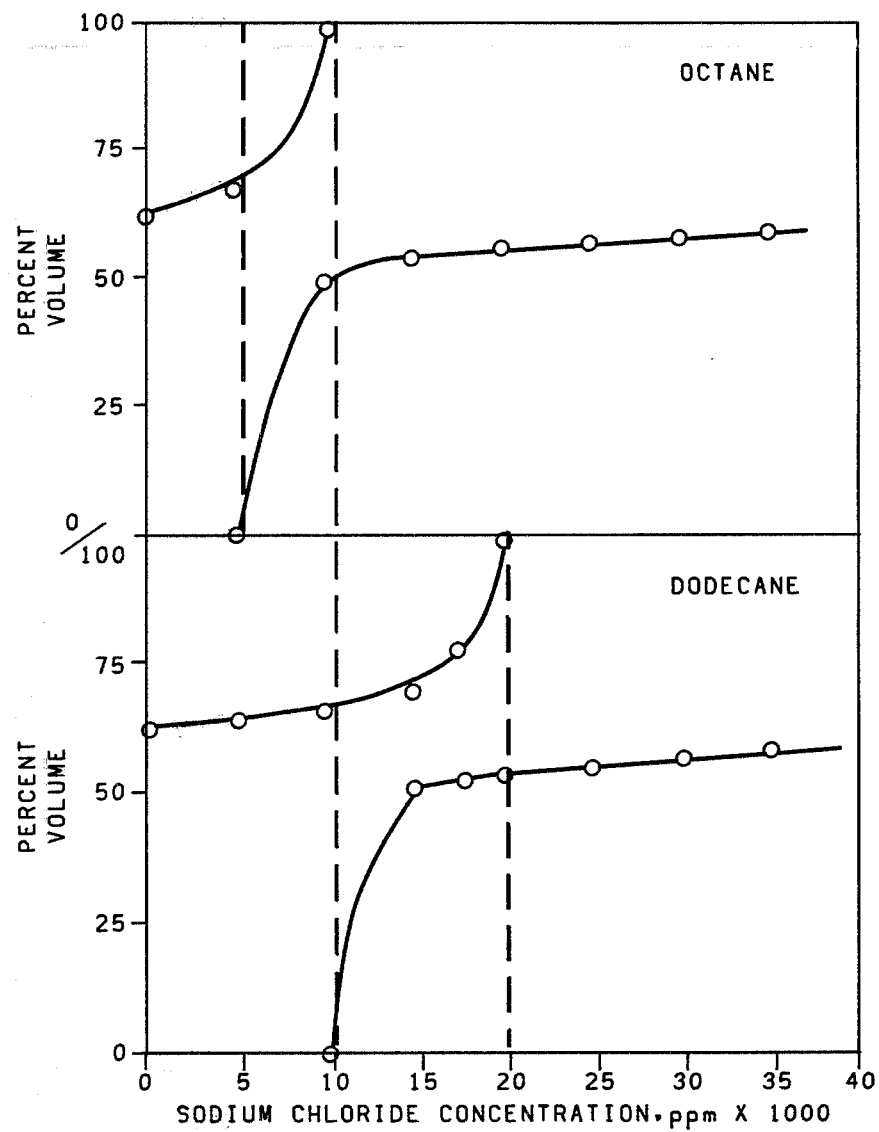
FIG. 9 are phase volume diagrams similar to FIG. 2 for octane and dodecane.

The EACN of a crude oil was determined as follows: Mixtures of equal volumes of a series of pure alkane hydrocarbons and 3% by weight of a deoiled sodium petroleum sulfonate, 3% by weight of isobutyl alcohol and distilled water, were equilibrated at varying sodium chloride concentrations. The phase volumes were measured and the phase volumes versus salinity were plotted for each hydrocarbon. FIG. 9 shows typical phase volume diagrams for octane (EACN 8) and dodecane (EACN 12).

Figure 10:
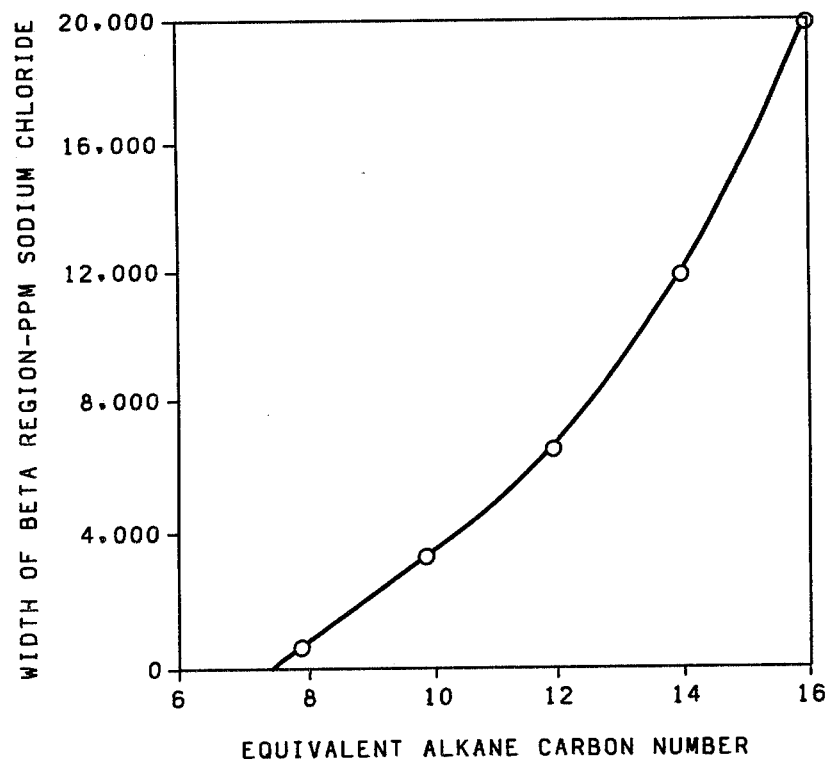
FIG. 10 is a plot showing the relationship of the width of the three phase region of equilibrated mixtures of a surfactant system and oils of various equivalent alkane carbon numbers.

The width of the three phase regions of the phase volume diagrams was then plotted versus EACN to produce a curve as illustrated in FIG. 10.

Figure 11:
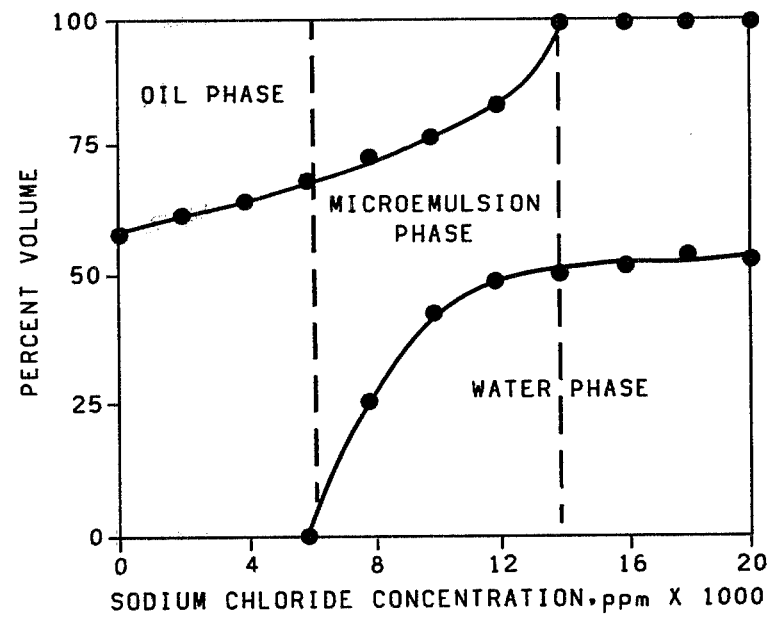
FIG. 11 is a phase volume diagram showing the compositions of equilibrated mixtures of oil and surfactant systems having various salinities.

The crude oil to be characterized was then equilibrated under the same conditions and with the same surfactant and cosurfactant. Phase volume versus salinity was plotted as illustrated by FIG. 11.

The width of the beta or three phase region was then determined and the EACN (12.2) of the crude oil was read from the function of FIG. 10.

While specific materials and specific procedures have been set forth herein, it is to be understood that variations and modifications thereof will be apparent to one skilled in the art and that such variations and modifications are included herein. Consequently, the specific examples set forth herein by way of illustration are not to be considered as limiting.

What is claimed is:

1. A method of characterizing a petroleum sulfonate of unknown average equivalent weight, comprising:
   (a) identifying at least one substantially pure hydrocarbon which forms three phases, comprising; a predominantly water phase, a microemulsion phase and a predominantly oil phase, by equilibrating a mixture of said petroleum sulfonate of unknown average equivalent weight, water, an electrolyte and at least one substantially pure hydrocarbon; and
   (b) assigning an effective average equivalent weight to said petroleum sulfonate of unknown average equivalent weight which is substantially equal to the average equivalent weight of a similarly prepared petroleum sulfonate of known average equivalent weight which when equilibrated with water, said electrolyte of step (a) and at least one substantially pure hydrocarbon, having an equivalent alkane carbon number substantially equal to the equivalent alkane carbon number of the pure hydrocarbon thus identified in step (a), in substantially the same proportions and under substantially the same conditions as said equilibration of step (a), forms three phases, comprising; a predominantly water phase, a microemulsion phase and a predominantly oil phase.

2. A method in accordance with claim 1 wherein the pure hydrocarbon is identified in step (a) by identifying the pure hydrocarbon whose equivalent alkane carbon number is essentially midway between the equivalent alkane carbon number of that pure hydrocarbon having the lowest equivalent alkane carbon number which forms three phases, comprising; a predominantly water phase, a microemulsion phase and a predominantly oil phase, when a mixture thereof with the petroleum sulfonate of unknown average equivalent weight, water and the electrolyte of step (a) is equilibrated in the same proportions and under the same conditions as the equilibration of step (a), and the equivalent alkane carbon number of that pure hydrocarbon having the highest equivalent alkane carbon number which forms three phases of the previously-mentioned character when a mixture thereof with said petroleum sulfonate of unknown average equivalent weight, water and said electrolyte of step (a) is equilibrated in the same proportions and under the same conditions as said equilibration of step (a).

3. A method in accordance with claim 1 wherein the pure hydrocarbon is identified in step (a) by equilibrating mixtures of the petroleum sulfonate of unknown average equivalent weight, water, the electrolyte of step (a) and each of a series of the pure hydrocarbons having equivalent alkane carbon numbers between about 1 and about 20 and identifying the pure hydrocarbon whose equivalent alkane carbon number is essentially midway between the equivalent alkane carbon number of that one of said series of pure hydrocarbons having the lowest equivalent alkane carbon number which forms three phases, comprising; a predominantly water phase, a microemulsion phase and a predominantly oil phase, when said mixture thereof with said petroleum sulfonate of unknown average equivalent weight, water and the electrolyte of step (a) is thus equilibrated in the same proportions and under the same conditions as the equilibration of step (a), and the equivalent alkane carbon number of that one of said series of pure hydrocarbons having the highest equivalent alkane carbon number which forms three phases of the previously-mentioned character when said mixture thereof with said petroleum sulfonate of unknown average equivalent weight, water and said electrolyte of step (a) is thus equilibrated in the same proportions and under the same conditions as said equilibration of step (a).

4. A method in accordance with claim 3 wherein the pure hydrocarbon is identified in step (a) by measuring the volume percent of each phase of each equilibrated mixture, plotting said volume percent of each phase versus the equivalent alkane carbon number of the series of pure hydrocarbons to produce a phase-volume diagram and identifying the pure hydrocarbon having an equivalent alkane carbon number which appears at the midpoint of the three phase region of the thus plotted phase-volume diagram.

5. A method in accordance with claim 1, 3 or 4 wherein the petroleum sulfonate of known average equivalent weight whose average equivalent weight is assigned to the petroleum sulfonate of unknown average equivalent weight is selected by equilibrating a series of mixtures of each of a series of similarly prepared petroleum sulfonates of known average equivalent weight, water, the electrolyte of step (a) and each of a series of pure hydrocarbons having equivalent alkane carbon numbers between about 1 and about 20, measuring the volume percent of each phase of each of said equilibrated mixtures, plotting said volume percent of each phase versus the equivalent alkane carbon numbers of said series of pure hydrocarbons to produce a phase-volume diagram for each of said series of petroleum sulfonates of known average equivalent weight, and selecting that petroleum sulfonate of known average equivalent weight whose phase-volume diagram includes within its three phase region the alkane carbon number of the pure hydrocarbon identified in step (a).

6. A method in accordance with claims 1, 3 or 4 wherein the effective average equivalent weight assigned to the petroleum sulfonate of unknown average equivalent weight is determined by equilibrating a series of mixtures of each of a series of similarly prepared petroleum sulfonates of known average equivalent weight, water, the electrolyte of step (a) and each of a series of pure hydrocarbons having equivalent alkane carbon numbers between about 1 and about 20, measuring the volume percent of each phase of each of said equilibrated mixtures, plotting said volume percent of each phase versus the equivalent alkane carbon numbers of said series of pure hydrocarbons to produce a phase-volume diagram for each of said series of petroleum sulfonates of known average equivalent weight, determining the equivalent alkane carbon numbers which appear at approximately the midpoints of the three phase region of the thus plotted phase-volume diagrams, plotting the average equivalent weight of ech of said series of petroleum sulfonates of known average equivalent weight versus said midpoint equivalent alkane carbon numbers determined from said thus plotted phase-volume diagrams and assigning to said petroleum sulfonate of unknown average equivalent weight the average equivalent weight which appears on the thus plotted function of the last-mentioned plot, of average equivalent weight versus midpoint equivalent alkane carbon number, at an equivalent alkane carbon substantially equal to the equivalent alkane carbon number of the pure hydrocarbon identified in step (a).

7. A method of characterizing a sodium petroleum sulfonate of unknown average equivalent weight, comprising;
(a) determining the midpoint equivalent alkane carbon number which is approximately midway between the equivalent alkane carbon number of that substantially pure hydrocarbon which has the lowest equivalent alkane carbon number and the equivalent alkane carbon number of that substantially pure hydrocarbon which has the highest equivalent alkane carbon number which form three phases, comprising; a predominantly water phase, a microemulsion phase and a predominantly oil phase, by equilibrating a series of said pure hydrocarbons, of various equivalent alkane carbon numbers, with said sulfonate of unknown average equivalent weight, an electrolyte and water; and
(b) assigning an effective average equivalent weight to said sulfonate of unknown average equivalent weight as determined by the following relationship:

$$EAEW = 6.6\ C_{mp} + 333$$

wherein EAEW is the effective average equivalent weight of said sulfonate of unknown average equivalent weight and $C_{mp}$ is the midpoint equivalent alkane carbon number as determined in step (a).

8. A method of characterizing an ammonium petroleum sulfonate of unknown average equivalent weight, comprising;
(a) determining the midpoint equivalent alkane carbon number which is approximately midway between the equivalent alkane carbon number of that substantially pure hydrocarbon which has the lowest equivalent alkane carbon number and the equivalent alkane carbon number of that substantially pure hydrocarbon which has the highest equivalent alkane carbon number which form three phases, comprising; a predominantly water phase, a microemulsion phase and a predominantly oil phase, by equilibrating a series of said pure hydrocarbons, of various equivalent alkane carbon numbers, with said sulfonate of unknown average equivalent weight, an electrolyte and water; and
(b) assigning an effective average equivalent weight to said sulfonate of unknown average equivalent weight as determined by the following relationship:

$$EAEW = 6.6\ C_{mp} + 319$$

wherein EAEW is the effective average equivalent weight of said sulfonate of unknown average equivalent weight and $C_{mp}$ is the midpoint equivalent alkane carbon number as determined in step (a).

9. A method of preparing a crude oil displacing mixture, containing; at least one petroleum sulfonate of unknown average equivalent weight, an electrolyte and water, comprising;
(a) identifying at least one substantially pure hydrocarbon which forms three phases, comprising; a predominantly water phase, a microemulsion phase and a predominantly oil phase, by equilibrating a mixture of said petroleum sulfonate of unknown average equivalent weight, water, an electrolyte and at least one substantially pure hydrocarbon;
(b) assigning an effective average equivalent weight to said petroleum sulfonate of unknown average equivalent weight which is substantially equal to the average equivalent weight of a similarly prepared petroleum sulfonate of known average equivalent weight which when equilibrated with water, said electrolyte of step and at least one substantially pure hydrocarbon, having an equivalent alkane carbon number substantially equal to the equivalent alkane carbon number of the pure hydrocarbon thus identified in step (a), in substantially the same proportions and under substantially the same conditions as said equilibration of step (a), forms three phases, comprising; a predominantly water phase, a microemulsion phase and a predominantly oil phase;
(c) equilibrating mixtures of said crude oil, said petroleum sulfonate of unknown average equivalent weight, a plurality of different concentrations of said electrolyte of step (a) and water, in the same proportions and under the same conditions as the equilibration of step (a) except for said concentration of said electrolyte;
(d) determining the range of concentration of said electrolyte between the lowest electrolyte concentration at which three phases, comprising; a predominantly oil phase, a microemulsion phase and a predominantly water phase, form and the highest electrolyte concentration at which three phases of the previously-mentioned character form in the thus equilibrated mixtures of step (c);

(e) preparing at least one second petroleum sulfonate having an average equivalent weight differing from the effective average equivalent weight assigned to said first petroleum sulfonate of unknown average equivalent weight in accordance with step (b) and adapted to exhibit a lower range of concentration of said electrolyte between the lowest electrolyte concentration at which three phases, comprising; a predominantly water phase, a microemulsion phase and a predominantly oil phase, form and the highest electrolyte concentration at which three phases of the previously-mentioned character form, when mixtures of said crude oil, said second petroleum sulfonate, a plurality of concentrations of said electrolyte of step (a) and water are equilibrated in the same proportions and under the same conditions as the equilibration of step (a) except for said concentration of said electrolyte; and (f) mixing said second petroleum sulfonate, said electrolyte of step (a) and water in proportions sufficient to displace said crude oil.

10. A method in accordance with claim 9 wherein the second petroleum sulfonate is prepared in accordance with step (e) by blending the first petroleum sulfonate and a third petroleum sulfonate.

11. A method in accordance with claim 10 wherein the third petroleum sulfonate is a petroleum sulfonate of known average equivalent weight and the average equivalent weight of the second petroleum sulfonate is determined by the relationship:

$$\text{Avg. Eq. Wt.} = \frac{\sum_i W_i}{\sum_i \frac{W_i}{\text{Avg. Eq. Wt.}}}$$

wherein the running index i extends over said first and third petroleum sulfonates and W is the active weight of each of said first and third petroleum sulfonates.

12. A method in accordance with claim 10 wherein the third petroleum sulfonate is a petroleum sulfonate of unknown average equivalent weight; an effective average equivalent weight is assigned to said third petroleum sulfonate in accordance with steps (a) and (b) and the average equivalent weight of the second petroleum sulfonate is determined by the relationship:

$$\text{Avg. Eq. Wt.} = \frac{\sum_i W_i}{\sum_i \frac{W_i}{\text{Avg. Eq. Wt.}}}$$

wherein the running index i extends over said first and third petroleum sulfonates and W is the active weight of each of said first and third petroleum sulfonates.

13. A method in accordance with claim 9 wherein the second petroleum sulfonate is prepared in accordance with step (e) by changing one of (a) the nature of at least one of the feed materials (b) the proportions of said feed materials or (c) one of the conditions of operation in the manufacture of said second petroleum sulfonate.

14. A method in accordance with claim 9 wherein the range of concentration of the electrolyte exhibited by the second petroleum sulfonate is less than about 1 weight percent, based on the weight of the water.

15. A method in accordance with claim 9 wheren the pure hydrocarbon is identified in step (a) by identifying the pure hydrocarbon whose equivalent alkane carbon number is essentially midway between the equivalent alkane carbon number of that pure hydrocarbons having the lowest equivalent alkane carbon number which forms three phases, comprising: a predominantly water phase, a microemulsion phase and a predominantly oil phase, when a mixture thereof with the petroleum sulfonate of unknown average equivalent weight, water and the electrolyte of step (a) is equilibrated in the same proportions and under the same conditions as the equilibration of step (a), and the equivalent alkane carbon number of that pure hydrocarbon having the highest equivalent alkane carbon number which forms three phases of the previously-mentioned character when a mixture thereof with said petroleum sulfonate of unknown average equivalent weight, water and said electrolyte of step (a) is equilibrated in the same proportions and under the same conditions as said equilibration of step (a).

16. A method in accordance with claim 9 wherein the pure hydrocarbon is identified in step (a) by equilibrating mixtures of the petroleum sulfonate of unknown average equivalent weight, water, the electrolyte of step (a) and each of a series of the pure hydrocarbons having equivalent alkane carbon numbers between about 1 and about 20 and identifying the pure hydrocarbon whose equivalent alkane carbon number is essentially midway between the equivalent alkane carbon number of that one of said series of pure hydrocarbons having the lowest equivalent alkane carbon number which forms three phases, comprising; a predominantly water phase, a microemulsion phase and a predominantly oil phase, when said mixture thereof with said petroleum sulfonate of unknown average equivalent weight, water and the electrolyte of step (a), is thus equilibrated in the same proportions and under the same conditions as the equilibration of step (a), and the equivalent alkane carbon number of that one of said series of pure hydrocarbons having the highest equivalent alkane carbon number which forms three phases of the previously-mentioned character when said mixture thereof with said petroleum sulfonate of unknown average equivalent weight, water and said electrolyte of step (a) is thus equilibrated in the same proportions and under the same conditions as said equilibration of step (a).

17. A method in accordance with claim 16 wherein the pure hydrocarbon is identified in step (a) by measuring the volume percent of each phase of each equilibrated mixture, plotting said volume percent of each phase versus the equivalent alkane carbon number of the series of pure hydrocarbons to produce a phase-volume diagram and identifying the pure hydrocarbons having an equivalent alkane carbon number which appears at the midpoint of the three phase region of the thus plotted phase-volume diagram.

18. A method in accordance with claim 9, 16 or 17 wherein the petroleum sulfonate of known average equivalent weight whose average equivalent weight is assigned to the petroleum sulfonate of unknown average equivalent weight is selected by equilibrating a series of mixtures of each of a series of similarly prepared petroleum sulfonates of known average equivalent weight, water, the electrolyte of step (a) and each of a series of pure hydrocarbons having equivalent alkane carbon numbers between about 1 and about 20, measuring the volume percent of each phase of each of said equilibrated mixtures, plotting said volume percent of each phase versus the equivalent alkane carbon numbers of said series of pure hydrocarbons to produce a phase-volume diagram for each of said series of petroleum sulfonates of known average equivalent weight, and selecting that petroleum sulfonate of known average equivalent weight whose phase-volume diagram includes within its three phase region the alkane carbon number of the pure hydrocarbon identified in step (a).

19. A method in accordance with claim 9, 16 or 17 wherein the effective average equivalent weight assigned to the petroleum sulfonate of unknown average equivalent weight is determined by equilibrating a series of mixtures of each of a series of similarly prepared petroleum sulfonates of known average equivalent weight, water, the electrolyte of step (a) and each of a series of pure hydrocarbons having equivalent alkane carbon numbers between about 1 and about 20, measuring the volume percent of each phase of each of said equilibrated mixtures, plotting said volume percent of each phase versus the equivalent alkane carbon numbers of said series of pure hydrocarbons to produce a phase-volume diagram for each of said series of petroleum sulfonates of known average equivalent weight, determining the equivalent alkane carbon numbers which appear at approximately the midpoints of the three phase region of said phase-volume diagrams, plotting the average equivalent weight of each of said series of petroleum sulfonates of known average equivalent weight versus said midpoint equivalent alkane carbon numbers determined from the thus plotted phase-volume diagrams and assigning to said petroleum sulfonate of unknown average equivalent weight the average equivalent weight which appears on the thus plotted function of the last-mentioned plot, of average equivalent weight versus midpoint equivalent alkane carbon number, at an equivalent alkane carbon substantially equal to the alkane carbon number of the pure hydrocarbon identified in step (a).

20. A method of preparing a crude oil displacing mixture containing; at least one sodium petroleum sulfonate of unknown average equivalent weight, an electrolyte and water, comprising;
   (a) determining the midpoint equivalent alkane carbon number which is approximately midway between the equivalent alkane carbon number of that substantially pure hydrocarbon which has the lowest equivalent alkane carbon number and the equivalent alkane carbon number of that substantially pure hydrocarbon which has the highest equivalent alkane carbon number which form three phases, comprising; a predominantly water phase, a microemulsion phase and a predominantly oil phase, by equilibrating a series of said pure hydrocarbons, of various equivalent alkane carbon numbers, with said petroleum sulfonte of unknown average equivalent weight, an electrolyte and water;
   (b) assigning an effective average equivalent weight to said petroleum sulfonate of unknown average equivalent weight as determined by the following relationship:

$$EAEW = 6.6\ C_{mp} + 333$$

wherein EAEW is the effective average equivalent weight of said petroleum sulfonate of unknown average equivalent weight and $C_{mp}$ is the midpoint equivalent alkane carbon number as determined in step (a);
   (c) equilibrating mixtures of said crude oil, said petroleum sulfonate of unknown average equivalent weight, a plurality of different concentrations of said electrolyte of step (a) and water, in the same proportions and under the same conditions as the equilibration of step (a) except for said concentration of said electrolyte;
   (d) determining the range of concentration of said electrolyte between the lowest electrolyte concentration at which three phases, comprising; a predominantly oil phase, a microemulsion phase and a predominantly water phase, form and the highest electrolyte concentration at which three phases of the previously-mentioned character form in the thus equilibrated mixtures of step (c);
   (e) preparing at least one second petroleum sulfonate having an average equivalent weight differing from the effective average equivalent weight assigned to said first petroleum sulfonate of unknown average equivalent weight in accordance with step (b) and adapted to exhibit a lower range of concentration of said electrolyte between the lowest electrolyte concentration at which three phases, comprising; a predominantly water phase, a microemulsion phase and a predominantly oil phase, form and the highest electrolyte concentration at which three phases of the previously-mentioned character form, when mixtures of said crude oil, said second petroleum sulfonate, a plurality of concentrations of said electrolyte of step (a) and water are equilibrated in the same proportions and under the same conditions as the equilibration of step (a) except for said concentration of said electroylte; and
   (f) mixing said second petroleum sulfonate, said electrolyte of step (a) and water in proportions sufficient to displace said crude oil.

21. A method of preparing a crude oil displacing mixture containing; at east one ammonium petroleum sulfate of unknown average equivalent weight, an electrolyte and water, comprising;
   (a) determining the midpoint equivalent alkane carbon number which is approximately midway between the equivalent alkane carbon number of that substantially pure hydrocarbon which has the lowest equivalent alkane carbon number and the equivalent alkane carbon number of that substantially pure hydrocarbon which has the highest equivalent alkane carbon number which form three phases, comprising; a predominantly water phase, a microemulsion phase and a predominantly oil phase, by equilibrating a series of pure hydrocarbons, of various equivalent alkane carbon numbers, with said petroleum sulfonate of unknown average equivalent weight, an electrolyte and water;
   (b) assigning an effective average equivalent weight to said petroleum sulfonate of unknown average equivalent weight as determined by the following relationship:

$$EAEW = 6.6\ C_{mp}30\ 319$$

wherein EAEW is the effective average equivalent weight of said petroleum sulfonate of unknown average equivalent weight and $C_{mp}$ is the midpoint equivalent alkane carbon number as determined in step (a);

(c) equilibrating mixtures of said crude oil, said petroleum sulfonate of unknown average equivalent weight, a plurality of different concentrations of said electrolyte of step (a) and water, in the same proportions and under the same conditions as the equilibration of step (a) except for said concentration of said electrolyte;

(d) determining the range of concentration of said electrolyte between the lowest electrolyte concentration at which three phases, comprising; a predominantly oil phase, a microemulsion phase and a predominantly water phase, form and the highest electrolyte concentration at which three phases of the previously-mentioned character form in the thus equilibrated mixtures of step (c);

(e) preparing at least one second petroleum sulfonate having an average equivalent weight differing from the effective average equivalent weight assigned to said first petroleum sulfonate of unknown average equivalent weight in accordance with step (b) and adapted to exhibit a lower range of concentration of said electrolyte between the lowest electrolyte concentration at which three phases, comprising; a predominantly water phase, a microemulsion phase and a predominantly oil phase, form and the highest electrolyte concentration at which three phases of the previously-mentioned character form, when mixtures of said crude oil, said second petroleum sulfonate, a plurality of concentrations of said electrolyte of step (a) and water are equilibrated in the same proportions and under the same conditions as the equilibration of step (a) except for said concentration of said electrolyte; and (f) mixing said second petroleum sulfonate, said electrolyte of step (a) and water in proportions sufficient to displace said crude oil.

22. A method of displacing crude oil from a subterranean reservoir with a displacing mixture, containing; at least one petroleum sulfonate of unknown average equivalent weight, an electrolyte and water, comprising:

(a) identifying at least one substantially pure hydrocarbon which forms three phases, comprising; a predominantly water phase, a microemulsion phase and a predominantly oil phase, by equilibrating a mixture of said petroleum sulfonate of unknown average equivalent weight, water, an electrolyte and said substantially pure hydrocarbon;

(b) assigning an effective average equivalent weight to said petroleum sulfonate of unknown average equivalent weight which is substantially equal to the average equivalent weight of a similarly prepared petroleum sulfonate of known average eqivalent weight which when equilibrated with water, said electrolyte of step (a) and at least one substantially pure hydrocarbon, having an equivalent alkane carbon number substantially equal to said equivalent alkane carbon number of the pure hydrocarbon thus identified in step (a), in substantially the same proportions and under substantially the same conditions as said equilibration of step (a), forms three phases, comprising; a predominantely water phase, a microemulsion phase and a predominantly oil phase;

(c) equilibrating mixtures of said crude oil, said petroleum sulfonate of unknown average equivalent weight, a plurality of different concentrations of said electrolyte of step (a) and water, in the same proportions and under the same conditions as the equilibration of step (a) except for said concentration of said electrolyte;

(d) determining the range of concentration of said electrolyte between the lowest electrolyte concentration at which three phases, comprising; a predominantly oil phase, a microemulsion phase and a predominantly water phase, form and the highest electrolyte concentration at which three phases of the previously-mentioned character form in the thus equilibrated mixtures of step (c);

(e) preparing at least one second petroleum sulfonate having an average equivalent weight differing from the effective average equivalent weight assigned to said first petroleum sulfonate of unknown average equivalent weight in accordance with step (b) and adapted to exhibit a lower range of concentration of said electrolyte between the lowest electrolyte concentration at which three phases, comprising; a predominantly water phase, a microemulsion phase and predominantly oil phase, form and the highest electrolyte concentration at which three phases of the previously-mentioned character form, when mixtures of said crude oil, said second petroleum sulfonate, a plurality of concentrations of said electrolyte of step (a) and water are equilibrated in the same proportions and under the same conditions as the equilibration of step (a) except for said concentrations of said electrolyte;

(f) mixing said second petroleum sulfonate, said electrolyte of step (a) and water in proportions sufficient to displace said crude oil;

(g) injecting at least a small slug of the mixture of step (f) into said reservoir through at least one injection well; and (h) withdrawing displaced crude oil from said reservoir through at least one production well.

23. A method in accordance with claim 22 wherein the second petroleum sulfonate is prepared in accordance with step (e) by blending the first petroleum sulfonate and a third petroleum sulfonate.

24. A method in accordance with claim 23 wherein the third petroleum sulfonate is a petroleum sulfonate of known average equivalent weight and the average equivalent weight of the second petroleum sulfonate is determined by the relationship:

$$\text{Avg. Eq. Wt.} = \frac{\sum_i W_i}{\sum_i \frac{W_i}{\text{Avg. Eq. Wt.}}}$$

wherein the running index i extends over said first and third petroleum sulfonates and W is the active weight of each of said first and third petroleum sulfonates.

25. A method in accordance with claim 23 wherein the third petroleum sulfonate is a petroleum sulfonate of unknown average equivalent weight; an effective average equivalent weight is assigned to said third petroleum sulfonate in accordance with steps (a) and (b) and the average equivalent weight of the second petroleum sulfonate is determined by the relationship:

$$\text{Avg. Eq. Wt.} = \frac{\sum_i W_i}{\sum_i \frac{W_i}{\text{Avg. Eq. Wt.}}}$$

wherein the running index 1 extends over said first and third petroleum sulfonates and W is the active weight of each of said first and third petroleum sulfonates.

26. A method in accordance with claim 22 wherein the second petroleum sulfonate is prepared in accordance with step (e) by changing one of (a) the nature of at least one of the feed materials (b) the proportions of said feed materials or (c) one of the conditions of operation in the manufacture of said second petroleum sulfonate.

27. A method in accordance with claim 22 wherein the range of concentration of the electrolyte exhibited by the second petroleum sulfonate is less than about 1 weight percent based on the weight of the water.

28. A method in accordance with claim 22 wherein the pure hydrocarbon is identified by step (a) by identifying the pure hydrocarbon whose equivalent alkane carbon number is essentially midway between the equivalent alkane carbon number of that pure hydrocarbon having the lowest equivalent alkane carbon number which forms three phases, comprising; a predominantly water phase, a microemulsion phase and a predominantly oil phase, when a mixture thereof with the petroleum sulfonate of unknown average equivalent weight, water and the electrolyte of step (a) is equilibrated in the same proportions and under the same conditions as the equilibration of step (a), and the equivalent alkane carbon number of that pure hydrocarbon having the highest equilvalent alkane carbon number which forms three phases of the previously-mentioned character when a mixture thereof with said petroleum sulfonate of unknown average equivalent weight, water and electrolyte of step (a) is equilibrated in the same proportions and under the same conditions as said equilibration of step (a).

29. A method in accordance with claim 22 wherein the pure hydrocarbon is identified in step (a) by equilibrating mixtures of the petroleum sulfonate of unknown average equivalent weight, water, the electrolyte of step (a) and each of a series of pure hydrocarbons having equivalent alkane carbon numbers between about 1 and about 20 and identifying the pure hydrocarbon whose equivalent alkane carbon number in midway between the equivalent alkane carbon number of that one of said series of pure hydrocarbons having the lowest equivalent alkane carbon number which forms three phases, comprising; a predominantly water phase, a microemulsion phase and a predominantly oil phase, when a mixture thereof with said petroleum sulfonate of unknown average equivalent weight, water and the electrolyte of step (a) is equilibrated in the same proportions and under the same conditions as the equilibration of step (a), and the equivalent alkane carbon number of that one of said series of pure hyrocarbons having the highest equivalent alkane carbon number which forms three phases of the previously-mentioned character when a mixture thereof with said petroleum sulfonate of unknown average equivalent weight, water and said electrolyte of step (a) is equilibrated in the same proportions and under the same conditions as said equilibration of step (a).

30. A method in accordance with claim 29 wherein the pure hydrocarbon is identified in step (a) by measuring the volume percent of each phase of each equilibrated mixture, plotting said volume percent of each phase versus the equivalent alkane carbon number of the series of pure hydrocarbons to produce a phase-volume diagram and identifying the pure hydrocarbon having an equivalent alkane carbon number which appears at the midpoint of the three phase region of thus plotted phase-volume diagram.

31. A method in accordance with claims 22, 29 or 30 wherein the petroleum sulfonate of known average equivalent weight whose average equivalent weight is assigned to the petroleum sulfonate of unknown average equivalent weight is selected by equilibrating a series of mixtures of each of a series of similarly prepared petroleum sulfonates of known average equivalent weight, water, the electrolyte of step (a) and each of a series of pure hydrocarbons having equivalent alkane carbon numbers between about 1 and about 20, measuring the volume percent of each phase of each of said equilibrated mixtures, plotting said volume percent of each phase versus the equivalent alkane carbon numbers of said series of pure hydrocarbons to produce a phase-volume diagram for each of said series of petroleum sulfonates of known average equivalent weight and selecting that petroleum sulfonate of known average equivalent weight whose phase-volume diagram includes within its three phase region the alkane carbon number of said petroleum sulfonate of the pure hydrocarbon selected in step (a).

32. A method in accordance with claim 22, 29 or 30 wherein the effective average equivalent weight assigned to the petroleum sulfonate of unknown average equivalent weight is determined by equilibrating a series of mixtures of each of a series of similarly prepared petroleum sulfonates of known average equivalent weight, water, the electrolyte of step (a) and each of a series of pure hydrocarbons having equivalent alkane carbon numbers between about 1 and about 20, measuring the volume percent of each phase of each of said equilibrated mixtures, plotting said volume percent of each phase versus the equivalent alkane carbon numbers of said series of pure hydrocarbons to produce a phase-volume diagram for each of said series of petroleum sulfonates of known average equivalent weight, determining the equivalent alkane carbon numbers which appear at approximately the midpoints of the three phase region of the thus plotted phase-volume diagrams, plotting the average equivalent weight of each of said series of petroleum sulfonates of known average equivalent weight versus said midpoint equivalent alkane carbon numbers determined from said phase-volume diagrams and assigning to said petroleum sulfonate of unknown average equivalent weight the average equivalent weight which appears on the function of the thus plotted last-mentioned plot, of average equivalent weight versus midpoint equivalent alkane carbon number, at an equivalent alkane carbon substantially equal to the alkane carbon number of the pure hydrocarbon identified in step (a).

33. A method of displacing oil from a subterranean reservoir with a displacing mixture, containing; at least one sodium petroleum sulfonate of unknown average equivalent weight, an electrolyte and water, comprising;

(a) determining the midpoint equivalent alkane carbon number which is approximately midway between the equivalent alkane carbon number of that substantially pure hydrocarbon which has the lowest equivalent alkane carbon number and the equivalent alkane carbon number of that substantially pure hydrocarbon which has the highest equivalent alkane carbon number which form three phases, comprising; a predominantly water phase, a microemulsion phase and a predominantly oil phase, by equilibrating a series of said pure hydrocarbons, of various equivalent alkane carbon numbers, with said sulfonate of unknown average equivalent weight, an electrolyte and water;

(b) assigning an effective average equivalent weight to said sulfonate of unknown average equivalent weight as determined by the following relationship:

$$EAEW = 6.6\ C_{mp} + 333$$

wherein EAEW is the effective average equivalent weight of said sulfonate of unknown average equivalent weight and $C_{mp}$ is the midpoint equivalent alkane carbon number as determined in step (a);

(c) equilibrating mixtures of said crude oil, said petroleum sulfonate of unknown average equivalent weight, a plurality of different concentrations of said electrolyte of step (a) and water, in the same proportions and under the same conditions as the equilibration of step (a) except for said concentration of said electrolyte;

(d) determining the range of concentration of said electrolyte between the lowest electrolyte concentration at which three phases, comprising; a predominantly oil phase, a microemulsion phase and a predominantly water phase, form and the highest electrolyte concentration at which three phases of the previously-mentioned character form in the thus equilibrated mixtures of step (c);

(e) preparing at least one second petroleum sulfonate having an average equivalent weight differing from the effective average equivalent weight assigned to said first petroleum sulfonate of unknown average equivalent weight in accordance with step (b) and adapted to exhibit a lower range of concentration of said electrolyte between the lowest electrolyte concentration at which three phases, comprising; a predominantly water phase, a microemulsion phase and a predominantly oil phase, form and the highest electrolyte concentration at which three phases of the previously-mentioned character form, when mixtures of said crude oil, said second petroleum sulfonate, a plurality of concentrations of said electrolyte of step (a) and water are equilibrated in the same proportions and under the same conditions as the equilibration of step (a) except for said concentration of said electrolyte;

(f) mixing said second petroleum sulfonate, said electrolyte and water in proportions sufficient to displace said crude oil;

(g) injecting at least a small slug of the mixture of step (f) into said reservoir through at least one injection well; and (h) withdrawing displaced crude oil from said reservoir through at least one production well.

34. A method of displacing oil from a subterranean reservoir with a displacing mixture, containing; at least one ammonium petroleum sulfonate of unknown average equivalent weight, an electrolyte and water, comprising;

(a) determining the midpoint equivalent alkane carbon number which is approximately midway between the equivalent alkane carbon number of that substantially pure hydrocarbon which has the lowest equivalent alkane carbon number and the equivalent alkane carbon number of that substantially pure hydrocarbon which has the highest equivalent alkane carbon number which form three phases, comprising; a predominantly water phase, a microemulsion phase and a predominantly oil phase, by equilibrating a series of said pure hydrocarbons, of various equivalent alkane carbon numbers, with said sulfonate of unknown average equivalent weight, an electrolyte and water;

(b) assigning an effective average equivalent weight to said sulfonate of unknown average equivalent weight as determined by the following relationship:

$$EAEW = 6.6\ C_{mp} + 319$$

wherein EAEW is the effective average equivalent weight of said sulfonate of unknown average equivalent weight and $C_{mp}$ is the midpoint equivalent alkane carbon number as determined in step (a);

(c) equilibrating mixtures of said crude oil, said petroleum sulfonate of unknown average equivalent weight, a plurality of different concentrations of said electrolyte of step (a) and water, in the same proportions and under the same conditions as the equilibration of step (a) except for said concentration of said electrolyte;

(d) determining the range of concentration of said electrolyte between the lowest electrolyte concentration at which three phases, comprising; a predominantly oil phase, a microemulsion phase and a predominantly water phase, form and the highest electrolyte concentration at which three phases of the previously-mentioned character form in the thus equilibrated mixtures of step (c);

(e) preparing at least one second petroleum sulfonate having an average equivalent weight differing from the effective average equivalent weight assigned to said first petroleum sulfonate of unknown average equivalent weight in accordance with step (b) and adapted to exhibit a lower range of concentration of said electrolyte between the lowest electrolyte concentration at which three phases, comprising; a predominantly water phase, a microemulsion phase and predominantly oil phase, form and the highest electrolyte concentration at which three phases of the previously-mentioned character form, when mixtures of said crude oil, said second petroleum sulfonate, a plurality of concentrations of said electrolyte of step (a) and water is equilibrated in the same proportions and under the same conditions as the equilibration of step (e) except for said concentration of said electrolyte;

(f) mixing said second petroleum sulfonate, said electrolyte and water in proportions sufficient to displace said crude oil;

(g) injecting at least a small slug of the mixture of step (f) into said reservoir through at least one injection well; and (h) withdrawing displaced crude oil from said reservoir through at least one production well.

* * * * *

UNITED STATES PATENT AND TRADEMARK OFFICE
CERTIFICATE OF CORRECTION

PATENT NO. : 4,255,270

DATED : March 10, 1981

INVENTOR(S) : Donald M. Sitton et al.

It is certified that error appears in the above—identified patent and that said Letters Patent is hereby corrected as shown below:

Claim 6, line 30, after "of" and before "of", change "ech" to ---each---;
Claim 9, line 49 after "step" and before "and", insert ---(a)---;
Claim 12, line 55, insert ---$\Sigma$--- before $W_i$; line 55 1/2, delete "$\Sigma$";
Claim 15, line 7, change "hydrocarbons" to ---hydrocarbon---;
Claim 20, line 57, change "sulfonte" to ---sulfonate---;
Claim 21, line 41, change "east" to ---least---; line 42, change "sulfate" to ---sulfonate---;
Claim 21, line 63, change "EAEW= 6.6 $C_{mp}$ 30 319" to ---EAEW= 6.6 $C_{mp}$ + 319---;
Claim 24, line 51, insert ---$\Sigma$--- before "W"; line 51 1/2 delete "$\Sigma$".
Claim 25, line 67, insert ---$\Sigma$--- before "W", line 67 1/2 delete "$\Sigma$".
Claim 28, line 16, after "identified" and before "step", change "by" to ---in---;
Claim 29, line 43, change "in" to ---is---.

Signed and Sealed this

Twenty-first Day of July 1981

[SEAL]

*Attest:*

*Attesting Officer*

GERALD J. MOSSINGHOFF

*Commissioner of Patents and Trademarks*